United States Patent
Kim et al.

(10) Patent No.: US 10,379,437 B2
(45) Date of Patent: Aug. 13, 2019

(54) X-RAY DETECTOR AND X-RAY IMAGING APPARATUS HAVING THE SAME

(71) Applicant: SAMSUNG ELECTRONICS CO., LTD., Suwon-si (KR)

(72) Inventors: Young Ik Kim, Suwon-si (KR); Jin-Woo Park, Osan-si (KR); Eun Jeong Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 14/953,064

(22) Filed: Nov. 27, 2015

(65) Prior Publication Data
US 2016/0154119 A1 Jun. 2, 2016

Related U.S. Application Data
(60) Provisional application No. 62/085,375, filed on Nov. 28, 2014.

(30) Foreign Application Priority Data

May 28, 2015 (KR) .................. 10-2015-0075478
Oct. 19, 2015 (KR) .................. 10-2015-0145197
Nov. 25, 2015 (KR) .................. 10-2015-0165930

(51) Int. Cl.
*G01T 1/24* (2006.01)
*G03B 42/02* (2006.01)
*G01T 1/20* (2006.01)

(52) U.S. Cl.
CPC .......... *G03B 42/025* (2013.01); *G01T 1/2018* (2013.01); *G01T 1/244* (2013.01)

(58) Field of Classification Search
None
See application file for complete search history.

(56) References Cited

U.S. PATENT DOCUMENTS

| 2010/0054404 A1* | 3/2010 | Watanabe | A61B 6/00 378/62 |
| 2010/0124698 A1* | 5/2010 | Wu | H01M 2/1066 429/100 |
| 2012/0069966 A1* | 3/2012 | Kobayashi | A61B 6/00 378/189 |
| 2016/0081649 A1* | 3/2016 | Enomoto | A61B 6/56 378/189 |

FOREIGN PATENT DOCUMENTS

JP 2005076414 * 3/2005

* cited by examiner

*Primary Examiner* — Hoon K Song
(74) *Attorney, Agent, or Firm* — Sughrue Mion, PLLC

(57) ABSTRACT

Disclosed herein is an X-ray imaging apparatus having an improved structure which is configured for preventing an entrance of foreign materials. The X-ray imaging apparatus includes: an X-ray source configured to generate X-rays, and to irradiate the generated X-rays; an X-ray detector configured to detect the irradiated X-rays; and a first frame and a second frame coupled with each other to form an outer appearance of the X-ray detector. The first frame is tightly coupled with the second frame so that no gap exists between the first frame and the second frame in order to prevent a foreign material from entering the inside of the X-ray detector.

21 Claims, 33 Drawing Sheets

(a)

(b)

(a)

(b)

(a)

(b)

(a)

(b)

X-RAY DETECTOR AND X-RAY IMAGING APPARATUS HAVING THE SAME

CROSS-REFERENCE TO RELATED APPLICATIONS

This application claims the benefit of U.S. Provisional Patent Application No. 62/085,375, filed on Nov. 28, 2014 in the U.S. Patent and Trademark Office, and priority from Korean Patent Application No. 10-2015-0075478, filed on May 28, 2015, Korean Patent Application No. 10-2015-0145197, filed on Oct. 19, 2015, and Korean Patent Application No. 10-2015-0165930, filed on Nov. 25, 2015 in the Korean Intellectual Property Office, the disclosures of which are incorporated herein by reference in their respective entireties.

BACKGROUND

1. Field

Exemplary embodiments relate to an X-ray detector and an X-ray imaging apparatus having the same, and more particularly, to an X-ray detector having an improved structure capable of preventing entrance of foreign materials and an X-ray imaging apparatus having the same.

2. Description of the Related Art

An X-ray imaging apparatus is equipment that is used for acquiring images of the inside of an object by using X-rays. The X-ray imaging apparatus images the inside of an object by using a non-invasive method of irradiating X-rays onto the object and detecting X-rays that propagate through the object. Accordingly, a medical X-ray imaging apparatus is used to diagnose an internal injury or a disease of an object that cannot be examined externally.

The X-ray imaging apparatus includes an X-ray source configured to generate X-rays and to irradiate the X-rays onto an object, and an X-ray detector configured to detect X-rays that propagate through the object. In order to image various parts of an object, the X-ray source can be configured to be movable. The X-ray detector can be used in a table mode when the X-ray detector is installed in a radiography table, in a stand mode when the X-ray detector is installed in a radiography stand, and in a portable mode when the X-ray detector is not fixed at a specific location.

However, the X-ray detector is vulnerable to foreign materials. For example, foreign materials which enter the inside of the X-ray detector may cause a failure or faulty operation of components installed in the X-ray detector. In particular, when the X-ray detector is used in the portable mode, the X-ray detector is more vulnerable to foreign materials, since the X-ray detector can be used in an outdoor environment, as well as in an indoor environment. Accordingly, a method for protecting the X-ray detector from foreign materials is needed.

SUMMARY

Therefore, it is an aspect of the exemplary embodiments to provide an X-ray detector having an improved structure capable of preventing foreign materials from entering a terminal of the X-ray detector and an X-ray imaging apparatus having the same.

It is another aspect of the exemplary embodiments to provide an X-ray detector having an improved structure capable of preventing foreign materials from entering the inside of the X-ray detector and an X-ray imaging apparatus having the same.

Additional aspects of the exemplary embodiments will be set forth in part in the description which follows and, in part, will be apparent from the description, or may be learned by practice of the exemplary embodiments.

In accordance with one aspect of one or more exemplary embodiments, there is provided an X-ray detector configured to detect X-rays irradiated from an X-ray source, the X-ray detector including: a scintillator configured to convert the detected X-rays into visible light; a sensing panel configured to convert the visible light outputted by the scintillator into an electrical signal; a circuit board electrically connected to the sensing panel, and configured to control a driving of the X-ray detector; a terminal; a coupling module configured to facilitate an electrical connection between the terminal and the circuit board; and a cap configured to regulate an opening or closing of the terminal in order to prevent a foreign material from entering the terminal.

The cap may be further configured to be coupled with the terminal in order to prevent the foreign material from entering the terminal by minimizing a size of a gap between the cap and the terminal.

The cap may be further configured to be detachably coupled with the X-ray detector by a magnetic force in order to regulate the opening or closing of the terminal.

The terminal may be formed in a side frame which forms a side appearance of the X-ray detector, and a first end of the cap may be fixed at the side frame by a fixing member, and a second end of the cap is detachably coupled with the side frame by a magnetic force in order to regulate the opening or closing of the terminal.

At least one magnetic substance may be disposed adjacent to the terminal on the side frame, and the cap may include: a metal member configured to interact with the at least one magnetic substance; and a sealing member with which the metal member is coupled.

The sealing member may include a first surface which faces the outside of the X-ray detector, and the metal member may be coupled with a first coupling part formed in the first surface.

The sealing member may include a second surface which faces an inside of the X-ray detector so as to face the terminal, and a second coupling part which protrudes toward the terminal and which is coupled with at least one inner surface of the terminal is formed in the second surface.

The sealing member may include a second surface which faces an inside of the X-ray detector so as to face the terminal, and the metal member may be coupled with a first coupling part formed in the second surface so as to directly contact the at least one magnetic substance.

At least one magnetic substance may be disposed adjacent to the terminal on the side frame, and the cap may include: a metal member configured to interact with the at least one magnetic substance; and a sealing member in which the metal member is installed.

At least one magnetic substance may be disposed adjacent to the terminal on the side frame, and the cap may include: a metal member configured to interact with the at least one magnetic substance; and a sealing member configured to surround at least one part of the metal member, the sealing member including a bent part which extends toward an inside of the X-ray detector.

In the side frame, a resting part which is recessed and on which the bent part rests may be formed.

The X-ray detector may further include a side frame which forms a side appearance of the X-ray detector, the side frame including a cap installation part with which the cap is detachably coupled, wherein the cap installation part may include: a first area in which the terminal and at least one magnetic substance are disposed, and a second area provided along at least one outer edge of the first area, and wherein in the second area, a rib which protrudes outward from the X-ray detector may be formed.

The cap may include: a metal member configured to interact with the at least one magnetic substance; and a sealing member configured to surround at least one part of the metal member, and if the cap is coupled with the cap installation part, the sealing member may physically contact the rib.

In accordance with another aspect of one or more exemplary embodiments, there is provided an X-ray detector configured to detect X-rays radiated from an X-ray source, the X-ray detector including: a terminal; a coupling module which is coupled with the terminal; and a cap which includes at least a first end that is fixed at the X-ray detector so as to regulate an opening or closing of the terminal in order to prevent a foreign material from entering the terminal.

In accordance with another aspect of one or more exemplary embodiments, an X-ray imaging apparatus includes: an X-ray source configured to generate X-rays, and to irradiate the generated X-rays; an X-ray detector configured to detect the irradiated X-rays; and a first frame and a second frame which are coupled with each other to form an outer appearance of the X-ray detector, wherein the first frame is configured to be coupled with the second frame such that a size of a gap between the first frame and the second frame is minimized in order to prevent a foreign material from entering the inside of the X-ray detector.

Along an area at which the first frame is coupled with the second frame, a sealing member may be disposed in the first frame, and a coupling groove into which the sealing member is insertable is formed in the second frame.

A protrusion pattern may be formed on a first one of the first frame and the second frame along an area at which the first frame is coupled with the second frame.

An adhesive member may be disposed on a second one of the first frame and the second frame, and coupled with the protrusion pattern.

The adhesive member may include a waterproof tape.

The adhesive member may include at least one from among a double-sided adhesive member and a single-sided adhesive member.

The first frame may include a side frame which forms a side appearance of the X-ray detector, and the second frame may include a bottom frame which is coupled with the side frame to form a bottom appearance of the X-ray detector.

On a first surface of the side frame which faces the bottom frame, a protrusion pattern which protrudes toward the bottom frame may be formed along at least one edge of the side frame.

On a first surface of the bottom frame which faces the side frame, an adhesive member may be disposed along at least one edge of the bottom frame so that the adhesive member is coupled with the protrusion pattern.

The first frame may include a bottom frame which forms a bottom appearance of the X-ray detector and which includes a battery accommodation part in which a battery is accommodated, and the second frame may include a battery cover configured to regulate an opening or closing of the battery accommodation part, and to be coupled with the battery accommodation part in order to prevent a foreign material from entering the battery accommodation part.

A sealing member may be disposed on a first surface of the battery cover which faces the battery accommodation part along at least one edge of the battery cover.

The sealing member may be integrated into the battery cover through double injection molding.

In the bottom frame, a coupling groove may be formed along at least one edge of the battery accommodation part so that the sealing member is insertable into the coupling groove.

The battery cover may include at least one coupling rib which is disposed outside the sealing member and which protrudes outward from the battery cover, and the at least one coupling rib may be inserted into at least one fixing groove formed in the bottom frame so that the at least one fixing groove is located outside the coupling groove.

The battery cover may be primarily coupled with the bottom frame by coupling of the at least one coupling rib with the at least one fixing groove, and then secondarily coupled with the bottom frame by a coupling member which has a protrusion, and the battery cover may further include a coupling part which the protrusion is coupled with or decoupled from according to rotation of the coupling member.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Hereinafter, exemplary embodiments will be described in detail with reference to the accompanying drawings. In the following description, the terms "front end", "back end", "upper part", "lower part", "top end", and "bottom end" are defined based on the drawings, and do not intend to limit shapes and locations of individual components.

Figure 1:
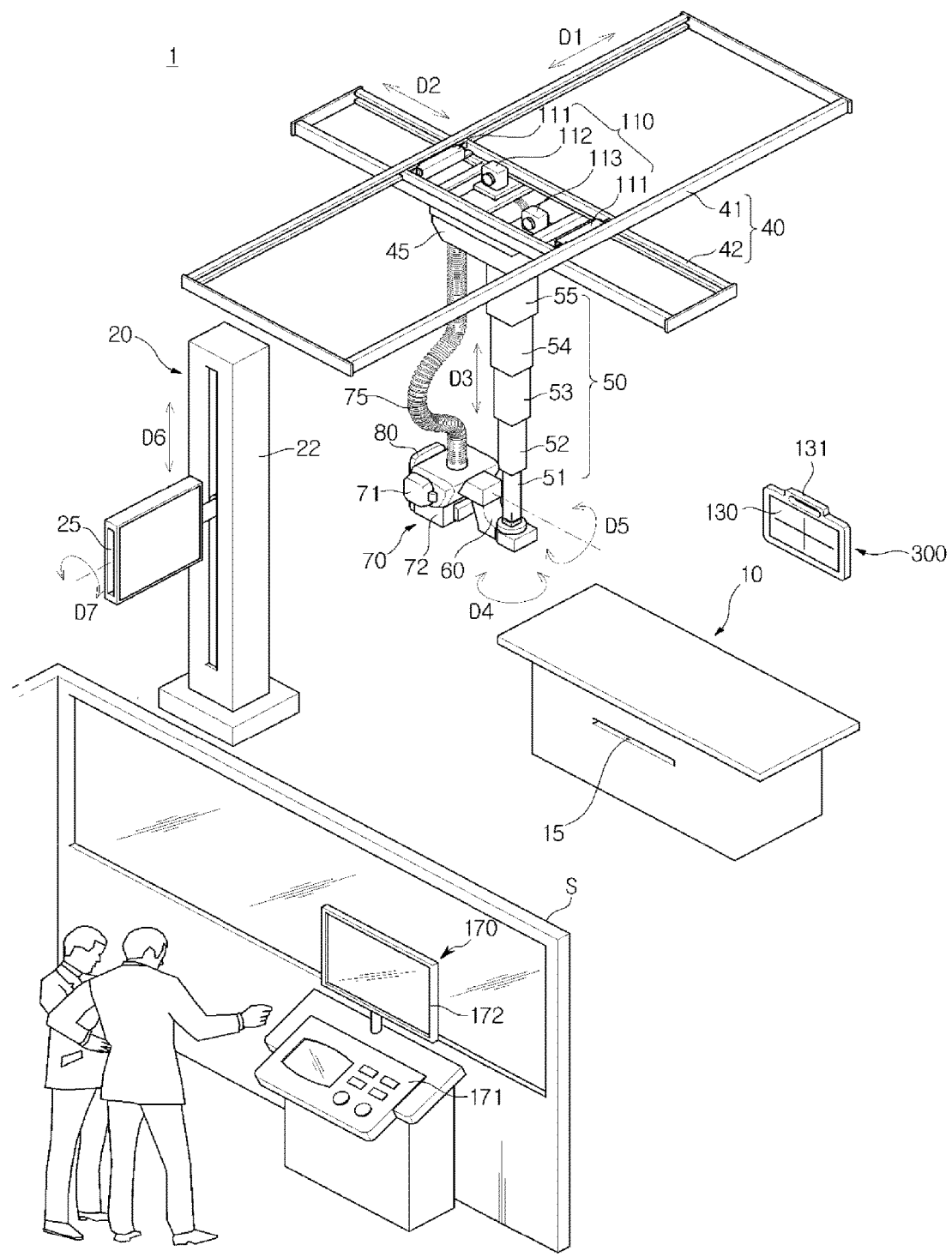
FIG. 1 is a perspective view of an X-ray imaging apparatus, according to an exemplary embodiment.
Figure 2:
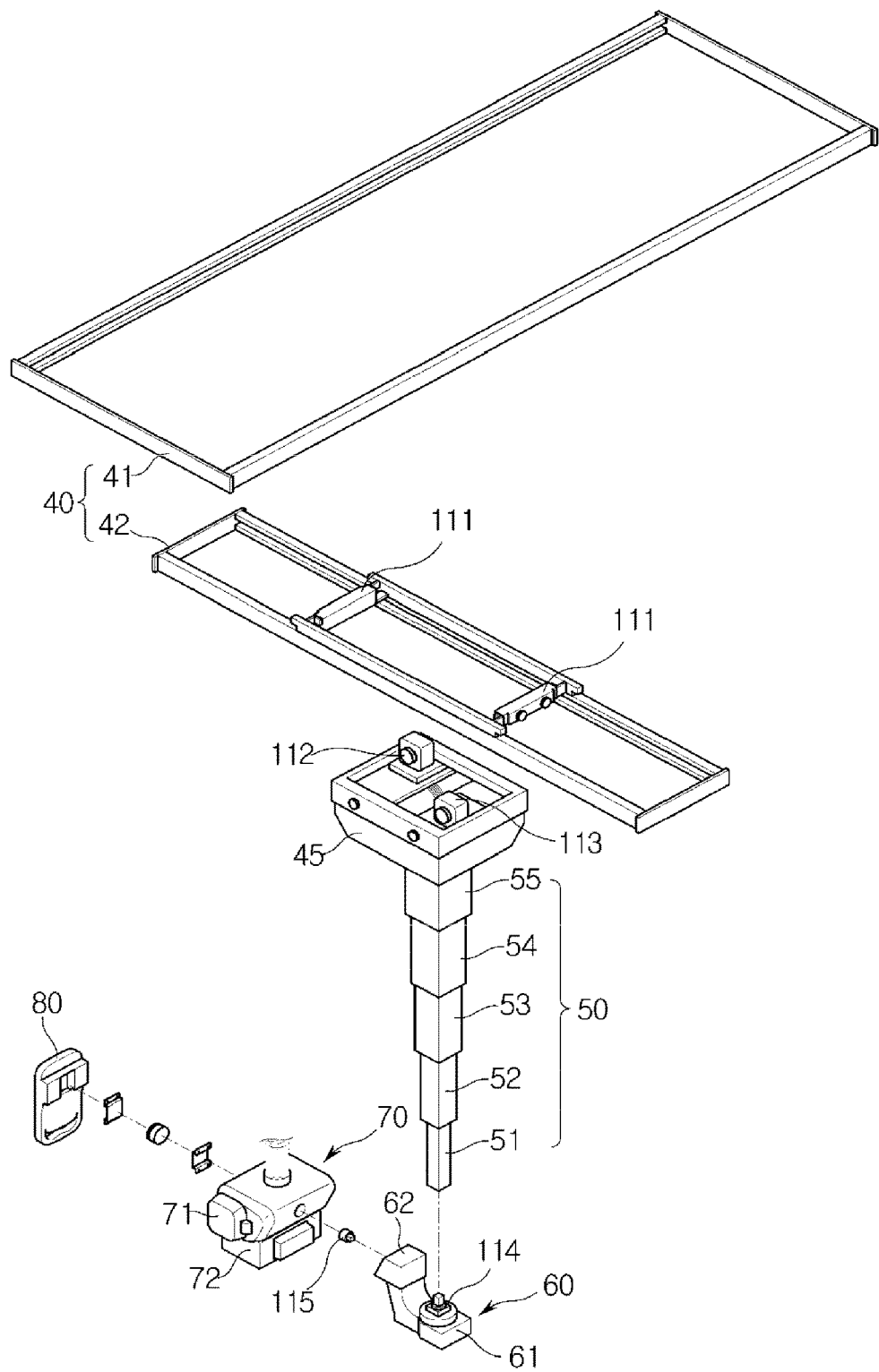
FIG. 2 is an exploded perspective view of an X-ray imaging apparatus, according to an exemplary embodiment.
Figure 3:
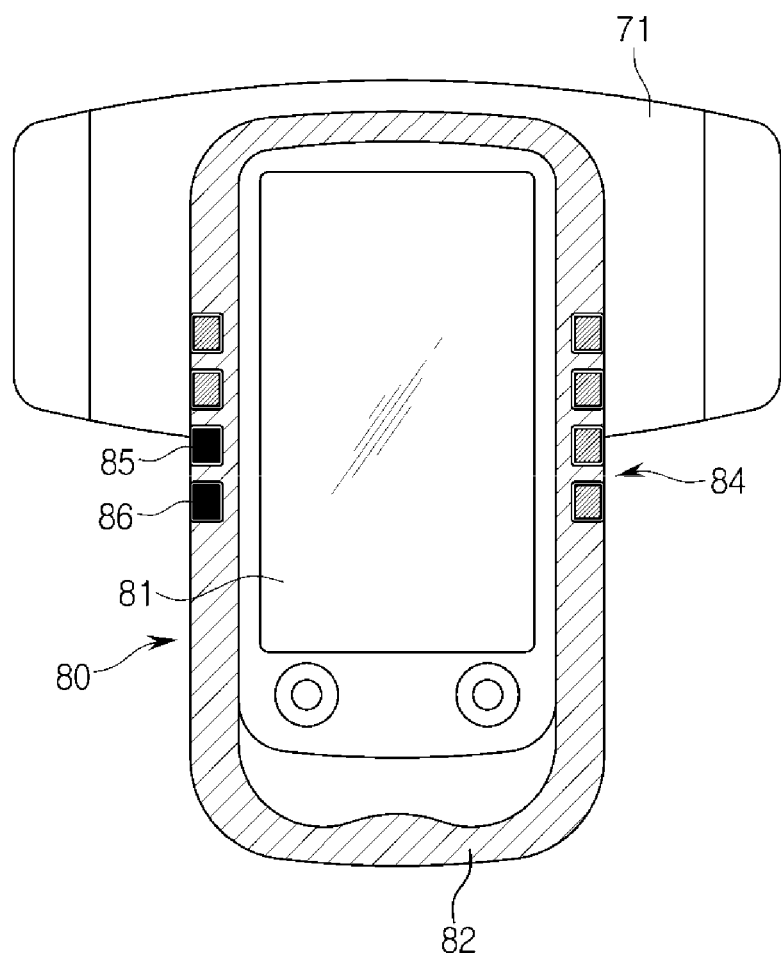
FIG. 3 is a front view of a control unit of an X-ray imaging apparatus, according to an exemplary embodiment.

FIG. 1 is a perspective view of an X-ray imaging apparatus, according to an exemplary embodiment, FIG. 2 is an exploded perspective view of the X-ray imaging apparatus, according to an exemplary embodiment, and FIG. 3 is a front view of a control unit of the X-ray imaging apparatus, according to an exemplary embodiment.

As shown in FIGS. 1, 2, and 3, an X-ray imaging apparatus 1 may include a guide rail unit 40, a moving carriage 45, a post frame 50, a motor unit 110, an X-ray source 70, an X-ray detector 300, a control unit (also referred to herein as a "controller") 80, and a workstation 170. The X-ray imaging apparatus 1 may further include a radiography table 10 and a radiography stand 20 in which the X-ray detector 300 can be installed.

The guide rail unit 40, the moving carriage 45, and the post frame 50 may be used to move the X-ray source 70 toward an object.

The guide rail unit 40 may include a first guide rail 41 and a second guide rail 42 that are arranged to form a predetermined angle with respect to each other. The first guide rail 41 may be orthogonal to the second guide rail 42.

The first guide rail 41 may be installed on a ceiling of an examination room where the X-ray imaging apparatus 1 is placed.

The second guide rail 42 may be disposed beneath the first guide rail 41, and may be configured slide with respect to the first guide rail 41. The first guide rail 41 may include a plurality of rollers (not shown) that are movable along the first guide rail 41. The second guide rail 42 may connect to the rollers and move along the first guide rail 41.

A longitudinal direction in which the first guide rail 41 extends is defined as a first direction D1, and a longitudinal direction in which the second guide rail 42 extends is defined as a second direction D2. Accordingly, the first direction D1 may be orthogonal to the second direction D2, and the first and second directions D1 and D2 may be parallel to the plane formed by the ceiling of the examination room.

The moving carriage 45 may be disposed beneath the second guide rail 42, and move along the second guide rail 42. The moving carriage 45 may include a plurality of rollers (not shown) to facilitate movement along the second guide rail 42. Accordingly, the moving carriage 45 is movable in the first direction D1 together with the second guide rail 42, and movable in the second direction D2 along the second guide rail 42. The post frame 50 may be fixed on the moving carriage 45 and disposed below the carriage 45. The post frame 50 may include a plurality of posts 51, 52, 53, 54, and 55.

The posts 51, 52, 53, 54, and 55 may connect to each other such that they can be folded with each other or nested together. The length of the post frame 50 fixed on the moving carriage 45 may increase or decrease in the elevation direction of the examination room.

A direction in which the length of the post frame 50 increases or decreases is defined as a third direction D3. Accordingly, the third direction D3 may be orthogonal to the first direction D1 and the second direction D2.

The X-ray source 70 may irradiate X-rays toward an object. Herein, the object may be a human's or animal's living body, however, the object is not limited to these. In this aspect, the object may include anything whose inside structure can be imaged by the X-ray imaging apparatus 1.

The X-ray source 70 may include an X-ray tube 71 which is configured to generate X-rays, and a collimator 72 which is configured to guide the generated X-rays to be directed toward an object. The X-ray tube 71 will be described in more detail below.

A revolute joint 60 may be disposed between the X-ray source 70 and the post frame 50.

The revolute joint 60 may couple the X-ray source 70 with the post frame 50, and support a load applied to the X-ray source 70.

The revolute joint 60 may include a first revolute joint 61 connected to the lower post 51 of the post frame 50, and a second revolute joint 62 connected to the X-ray source 70.

The first revolute joint 61 is rotatable with respect to the central axis of the post frame 50 extending in the elevation direction of the examination room. Accordingly, the first revolute joint 61 may rotate on a plane that is perpendicular to the third direction D3. The rotation direction of the first revolute joint 61 is defined as a fourth direction D4, and the fourth direction D4 is a rotation direction of an axis that is parallel to the third direction D3.

The second revolute joint 62 is rotatable on a plane that is perpendicular to the ceiling of the examination room. Accordingly, the second revolute joint 62 may rotate in a rotation direction of an axis that is parallel to the first direction D1 or the second direction D2. The rotation direction of the second rotation joint 62 is defined as a fifth direction D5, and the fifth direction D5 is a rotation direction of an axis extending in the first direction D1 or the second direction D2. The X-ray source 70 may connect to the revolute joint 60 and rotate in the fourth direction D4 and the fifth direction D5. In addition, the X-ray source 70 may connect to the post frame 50 through the revolute joint 60, and linearly move in any or all of the first direction D1, in the second direction D2, and in the third direction D3.

In order to facilitate a movement of the X-ray source 70 in the first direction D1 through the fifth direction D5, the motor unit 110 may be used. The motor unit 110 may be electrically driven, and may include encoders.

The motor unit 110 may include a first motor 111, a second motor 112, a third motor 113, a fourth motor 114, and a fifth motor 115 that correspond to the first direction D1, the second direction D2, the third direction D3, the fourth direction D4, and the fifth direction D5, respectively.

The first to fifth motors 111 to 115 may be arranged at appropriate respective locations in consideration of convenience of design. For example, the first motor 111 that is used to move the second guide rail 42 in the first direction D1 may be disposed within close proximity of the first guide rail 41, the second motor 112 that is used to move the moving carriage 45 in the second direction D2 may be disposed within close proximity of the second guide rail 42, and the third motor 113 that is used to increase or decrease the length of the post frame 50 in the third direction D3 may be disposed in the moving carriage 45. Further, the fourth motor 114 that is used to rotate the X-ray source 70 in the fourth direction D4 may be disposed within close proximity of the first revolute joint 61, and the fifth motor 115 that is used to rotate the X-ray source 70 in the fifth direction D5 may be disposed within close proximity of the second revolute joint 62.

The motor unit 110 may connect to power transfer means (not shown) in order to cause linear movement and/or rotation the X-ray source 70 in the first to fifth directions D1 to D5. The power transfer means may include any one or more of a belt and a pulley, a chain and a sprocket, or a shaft.

In one side of the X-ray source 70, the control unit 80 may be disposed to provide a user interface. The typical user is a person who diagnoses an object by using the X-ray imaging apparatus 1, and may be a medical staff member including any of a doctor, a radiological technologist, and a nurse. However, the user is not limited to the above-mentioned persons, and may include anyone who uses the X-ray imaging apparatus 1.

The control unit 80 may include, as illustrated in FIG. 3, a first display unit 81 and a plurality of buttons 84 to enable a user to input various kinds of information for radiography or to manipulate individual units. The first display unit 81 may be implemented as any of a Cathode Ray Tube (CRT), a Liquid Crystal Display (LCD), or a Light Emitting Diode (LED) display. However, the first display unit 81 is not limited to the above-mentioned types of display devices.

The buttons 84 may include a fourth directional rotation selection button 85, which relates to controlling a rotation of the X-ray source 70 in the fourth direction D4, and a fifth directional rotation selection button 86, which relates to controlling a rotation of the X-ray source 70 in the fifth direction D5. In this aspect, when a user wants to rotate the X-ray source 70 in the fourth direction D4, the user may cause the X-ray source 70 to rotate in the fourth direction D4 after pressing the fourth directional rotation selection button 85. When the user wants to rotate the X-ray source 70 in the fifth direction D5, the user may cause the X-ray source 70 to rotate in the fifth direction D5 after pressing the fifth directional rotation selection button 86 or while pressing the fifth directional rotation selection button 86. The locations of the fourth and fifth directional rotation selection buttons 85 and 86 shown in FIG. 3 are exemplary, and the fourth and fifth directional rotation selection buttons 85 and 86 may be arranged at different locations.

Further, the control unit 80 may include a handle 82 that the user can grip. The user may grip the handle 82 of the control unit 80 in order to apply power or torque, thereby causing the X-ray source 70 to move. This is defined as a manual move mode. Movement of the X-ray source 70 may be controlled by a motor controller (not shown), which is defined as an automatic move mode. In FIG. 3, the handle 82 is provided in the lower part of the control unit 80, however, the handle 82 may be provided at another location.

The X-ray detector 300 may detect X-rays which have propagated through the object. In the front side of the X-ray detector 300, an incident surface 130 onto which X-rays are incident may be provided, and a sensing panel 120 (see FIG. 5) may be installed in the X-ray detector 300. In the sensing panel 120, a plurality of pixels 150 (see FIG. 5) that respond to incident X-rays may be arranged in a matrix form. In the upper center part of the X-ray detector 300, a handle 131 may be provided so that the user can move or carry the X-ray detector 300.

The X-ray detector 300 may operate in any of various radiography modes in accordance with a positional configuration of the X-ray detector 300. In particular, the X-ray detector 300 may operate in a table mode when the X-ray detector 300 is installed in the radiography table 10, in a stand mode when the X-ray detector 300 is installed in the radiography stand 20, and in a portable mode when the X-ray detector 300 is positioned at an arbitrary location according to an object's location or an area to be photographed, without being installed in the radiography table 10 or the radiography stand 20. More particularly, accommodating slots into which the X-ray detector 300 can be inserted may be formed in the radiography table 10 and in the radiography stand 20. The accommodating slot formed in the radiography table 10 is defined as a first accommodating slot 15, and the accommodating slot formed in the radiography stand 20 is defined as a second accommodating slot 25. The second accommodating slot 25 is movable in the length direction of a support bar 22, and is rotatable in the rotation direction of an axis which is perpendicular to the length direction of the support bar 22, as illustrated in FIG. 1. The length direction of the support bar 22 is defined as a sixth direction D6, and the rotation direction of the axis which is perpendicular to the sixth direction D6 is defined as a seventh direction D7.

The workstation 170 may include an input unit 171 and a second display unit 172 in order to provide a user interface, similarly as the control unit 80. Accordingly, the user can input various kinds of information for radiography and/or manipulate individual units via the workstation 170. Further, the user may input various commands (e.g., a command for selecting a radiography location, a start command for radiography, etc.) related to operations of the X-ray imaging apparatus 1 via the workstation 170. In addition, the user may check images which are acquired during radiography via the workstation 170.

The input unit 171 may include at least one from among a switch, a keyboard, a trackball, a mouse, and a touch screen. If the input unit 171 is implemented as a Graphical User Interface (GUI) such as a touch screen, in other words, if the input unit 171 is implemented in software, the input unit 171 may be displayed through the second display unit 172. The second display unit 172 may include, similarly as the first display unit 81, any of a CRT, a LCD, or a LED display.

The workstation 170 may include any of various processors, such as a Central Processing Unit (CPU) or a Graphics Processing Unit (GPU), and a Printed Circuit Board (PCB), and may further include various kinds of storage units as necessary. Accordingly, the workstation 170 may accommodate main components (e.g., a controller) of the X-ray imaging apparatus 1 which are configured to make determinations for operations of the X-ray imaging apparatus 1 or to generate various control signals.

The workstation 170 may be placed in an independent space S from which X-rays can be blocked, and may be connected to the X-ray source 70 and the X-ray detector 300 via wired and/or wireless communication.

Figure 4:
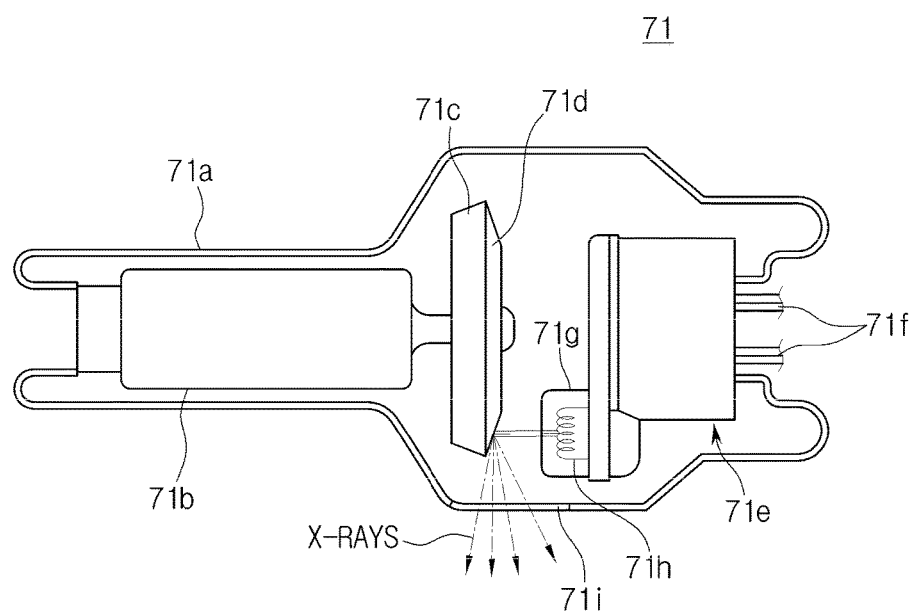
FIG. 4 is a cross-sectional view showing an internal structure of an X-ray tube included in an X-ray imaging apparatus, according to an exemplary embodiment.

The X-ray source 70 may generate X-rays, and irradiate the generated X-rays to an object. In order to generate X-rays, the X-ray source 70 may include an X-ray tube 71 as shown in FIG. 4. FIG. 4 illustrates an example of an internal structure of the X-ray tube 71.

The X-ray tube 71 may be embodied as a two-electrode vacuum tube which includes an anode 71c and a cathode 71e. The body of the two-electrode vacuum tube may be implemented as a glass tube 71a made of silica hard glass or the like.

The cathode 71e may include a filament 71h and a focusing electrode 71g configured for focusing electrons, and the focusing electrode 71g is also called a focusing cup. The inside of the glass tube 71a may be evacuated to a high vacuum state of approximately 10 mm Hg, and the filament 71h of the cathode 71e may be heated to a high temperature, thereby generating thermoelectrons. The filament 71h may be a tungsten filament, for example, and the filament 71h may be heated by applying a current to electrical leads 71f connected to the filament 71h. However, instead of the filament 71h, a carbon nano-tube which is capable of being driven with high-speed pulses may be used as the cathode 71e.

The anode 71c may be made of copper, for example, and a target material 71d may be applied on the surface of the anode 71c that faces the cathode 71e, wherein the target material 71d may include a high-resistance material, e.g., any of Cr, Fe, Co, Ni, W, or Mo. The higher the melting point of the target material 71d, the smaller the focal spot size.

When a relatively high voltage is applied between the cathode 71e and the anode 71c, thermoelectrons may be accelerated and collide with the target material 71d of the anode 71e, thereby generating X-rays. The X-rays may be irradiated to the outside through a window 71i. The window 71i may be a beryllium (Be) thin film.

The target material 71d may be rotated by a rotor 71b. When the target material 71d rotates, the heat accumulation rate may increase by a factor of 10 times per unit area and the focal spot size may be reduced, as compared to when the target material 71d is fixed.

The voltage that is applied between the cathode 71e and the anode 71c of the X-ray tube 71 is called a tube voltage. The magnitude of a tube voltage may be expressed as a crest value (kVp). When the tube voltage increases, a velocity of thermoelectrons may increase accordingly. Then, energy (i.e., photonic energy) of X-rays that are generated when the thermoelectrons collide with the target material 71d may also increase. A current that flows through the X-ray tube 71 is called a tube current, and can be expressed as an average value (e.g., in milliamperes (mA)). When a tube current increases, a dose of X-rays (that is, the number of X-ray photons) may increase. In summary, an energy level of X-rays can be controlled by adjusting a tube voltage. In addition, a dose of X-rays can be controlled by adjusting a tube current and an X-ray exposure time.

The X-ray detector 300 may detect X-rays irradiated by the X-ray source 70 which have then propagated through an object. The X-rays may be detected by the sensing panel 120 installed in the X-ray detector 300. The sensing panel 120 may convert the detected X-rays into electrical signals, and acquire an image that relates to the inside of the object.

The sensing panel 120 can be classified according to its material configuration, a method of converting detected X-rays into electrical signals, and a method of acquiring image signals.

The sensing panel 120 is classified into a mono type device or a hybrid type device according to its material configuration.

If the sensing panel 120 is a mono type device, a part which is configured for detecting X-rays and generating electrical signals, and a part which is configured for reading and processing the electrical signals may be semiconductors made of the same material, or may be manufactured by one process. In this case, the sensing panel 120 may include a Charge Coupled Device (CCD) or a Complementary Metal Oxide Semiconductor (CMOS) which is a light receiving device.

If the sensing panel 120 is a hybrid type device, a part which is configured for detecting X-rays and generating electrical signals, and a part which is configured for reading and processing the electrical signals may be made of different materials, or may be manufactured by different processes. For example, there are cases of detecting X-rays by using a light receiving device, such as a photodiode, a CCD, or CdZnTe, and reading and processing electrical signals by using a CMOS Read Out Integrated Circuit (CMOS ROIC), of detecting X-rays by using a strip detector, and reading and processing electrical signals by using a CMOS ROIC, and of using an a-Si or a-Se flat panel system.

The X-ray detector 300 may use a direct conversion mode and an indirect conversion mode according to a method of converting X-rays into electrical signals.

In the direct conversion mode, if X-rays are irradiated, electron-hole pairs are temporarily generated in a light receiving device, electrons move to an anode, and holes move to a cathode due to an electric field which is applied to both terminals of the light receiving device. The sensing panel 120 converts the movements of the electrons and holes into electrical signals. The light receiving device may be made of any of a-Se, CdZnTe, $HgI_2$, or $PbI_2$, for example.

In the indirect conversion mode, if X-rays irradiated from the X-ray source 70 react with a scintillator to emit photons having a wavelength of a visible light region, the light receiving device detects the photons and then converts the photons into electrical signals. The light receiving device may be made of a-Si, for example, and the scintillator may include any of a GADOX scintillator of a thin film type, or a CSI (TI) of a micro pillar type or a needle type.

The sensing panel 120 may use a Charge Integration Mode (CIM) which corresponds to storing charges for a predetermined time period and then acquiring a signal from the stored charges, or a Photon Counting Mode (PCM) which corresponds to counting the number of photons whenever a signal is generated by single X-ray photons, according to a method of acquiring electrical signals.

The material configuration of the sensing panel 120 and the signal conversion method of the sensing panel 120 are not limited, however, for convenience of description, in an exemplary embodiment which will be described below, the sensing panel 120 uses the direct conversion mode of acquiring electrical signals directly from X-rays, and the sensing panel 120 is a hybrid type in which a sensor chip for detecting X-rays is integrated with a read circuit chip and the PCM.

Figure 5:
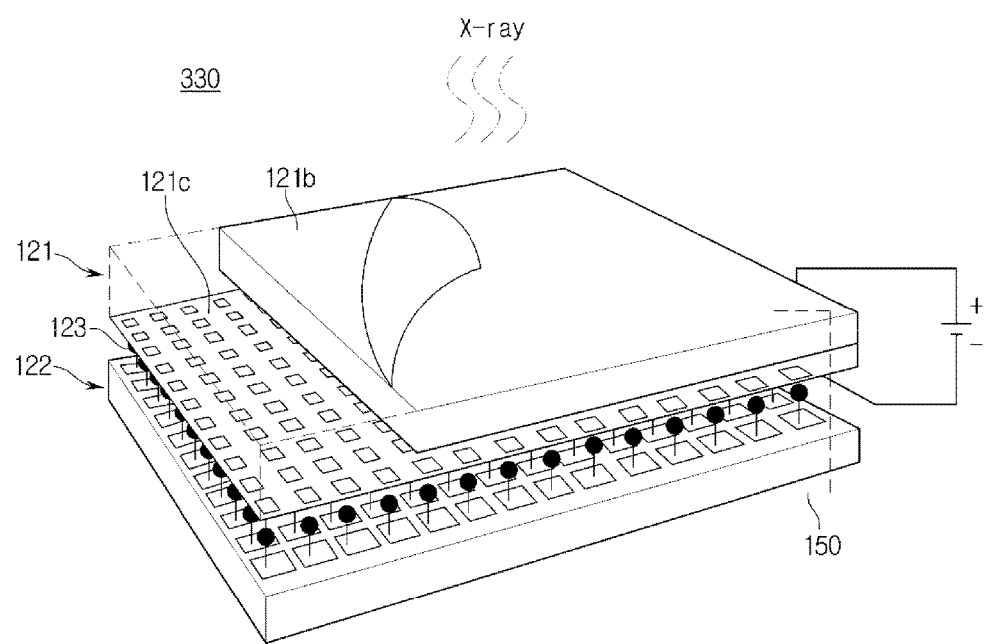
FIG. 5 schematically shows a structure of a sensing panel included in an X-ray imaging apparatus, according to an exemplary embodiment.

The sensing panel 120 may have a 2-dimensional (2D) array structure that includes a plurality of pixels 150, as shown in FIG. 5. FIG. 5 schematically illustrates a structure of the sensing panel 120.

Referring to FIG. 5, the sensing panel 120 may include a light receiving device 121 which is configured to detect X-rays and to convert the X-rays into electrical signals, and a read circuit 122 which is configured to read out the electrical signals.

The light receiving device 121 may be made of a single crystal semiconductor material in order to ensure high resolution, high response speed, and a high dynamic area even under conditions of low energy and a small dose of X-rays. The single crystal semiconductor material may include any of Ge, CdTe, CdZnTe, or GaAs.

The light receiving device 121 may be in the form of a PIN photodiode. The PIN photodiode may be fabricated by bonding a p-type semiconductor substrate 121c in the form of a 2D array on the lower surface of an n-type semiconductor substrate 121b which has a relatively high resistance.

The read circuit 122, which is fabricated according to a Complementary Metal Oxide Semiconductor (CMOS) process, may form a 2D array structure, and may be coupled with the p-type substrate 121c of the light receiving device 121 in units of pixels 150. The CMOS read circuit 122 and the light receiving device 121 may be coupled by a Flip-Chip Bonding (FCB) method. More specifically, the CMOS read circuit 122 and the light receiving device 121 may be coupled by forming bumps 123 with PbSn, In, or the like, reflowing, applying heat, and then compressing.

Figure 6:
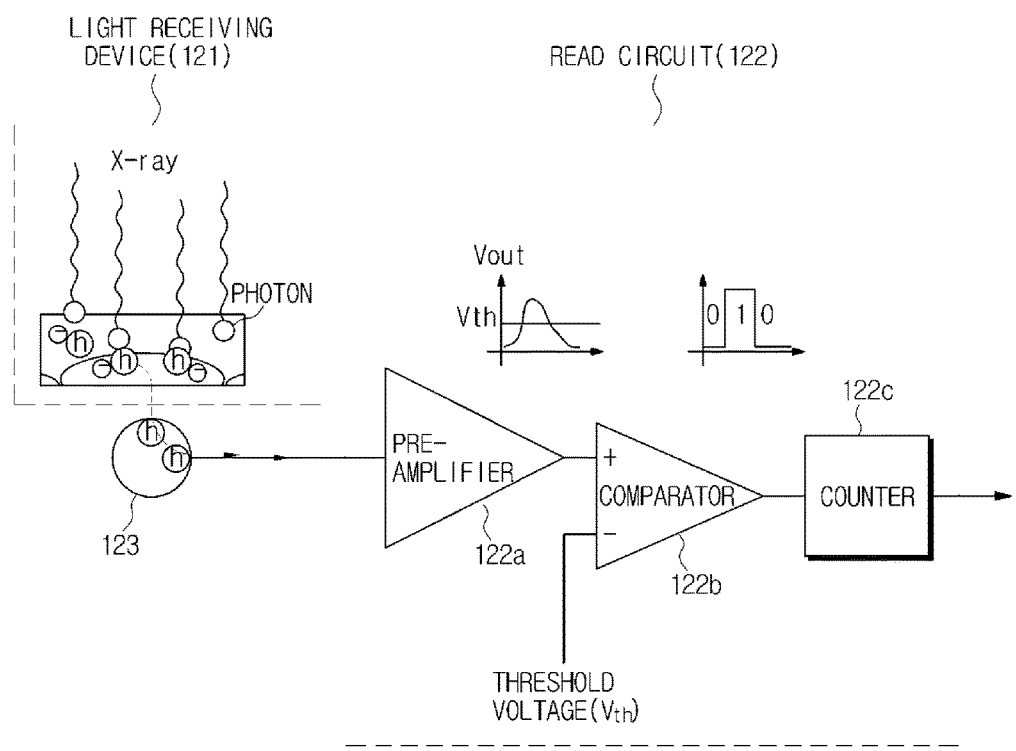
FIG. 6 is a circuit diagram schematically showing a pixel area of the sensing panel shown in FIG. 5.

FIG. 6 is a circuit diagram which schematically illustrates a pixel area of the sensing panel shown in FIG. 5.

Referring to FIG. 6, if photons of X-rays are incident to the light receiving device 121, electrons existing in a valence band may receive the energy of the photons to be excited to a conduction band over an energy gap of a band gap. Thereby, electron-hole pairs may be generated in a depletion region within which neither electrons nor holes exist.

If a reverse bias is applied after metal electrodes are respectively formed on the p-type layer and the n-type substrate of the light receiving device 121, electrons in the electron-hole pairs generated in the depletion region may move to the n-type region, and holes in the electron-hole pairs may move to the p-type region. The holes moved to the p-type region may be input to the read circuit 122 through the bumps 123.

Charges input to the read circuit 122 may be transferred to a pre-amplifier 122a, and the pre-amplifier 122a may output a voltage signal that corresponds to the charges.

The voltage signal output from the pre-amplifier 122a may be transferred to a comparator 122b. The comparator 122b may compare the voltage signal to a predetermined threshold voltage that can be controlled by an external device, in order to output a pulse signal of "1" or "0" as the result of the comparison. More specifically, if a voltage of the voltage signal is greater than the predetermined threshold voltage, the comparator 122b may output a signal of "1", and if the voltage of the voltage signal is smaller than the predetermined threshold voltage, the comparator 122b may output a signal of "0". The counter 122c may count the number of times a signal of "1" has been generated, and output the count value as digital data.

Figure 7:
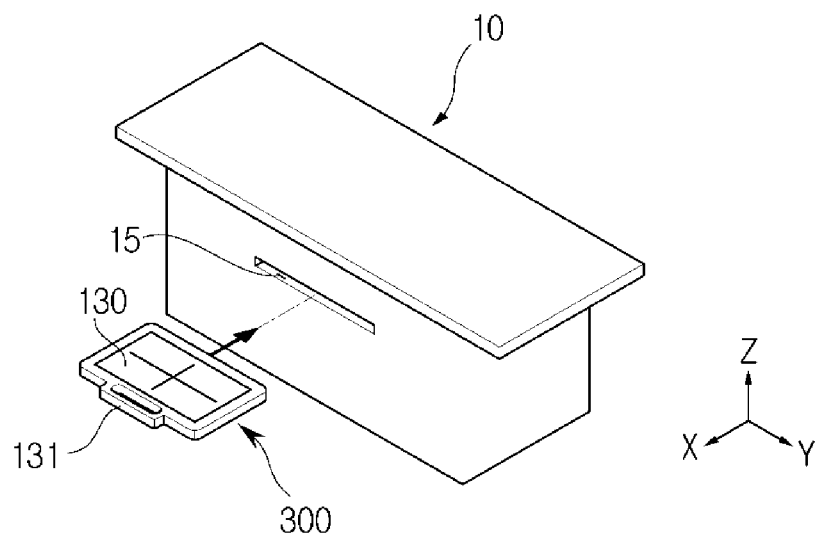
FIG. 7 is a view for describing a method in which an X-ray detector of an X-ray imaging apparatus according to an exemplary embodiment is installed in a radiography table.
Figure 7:
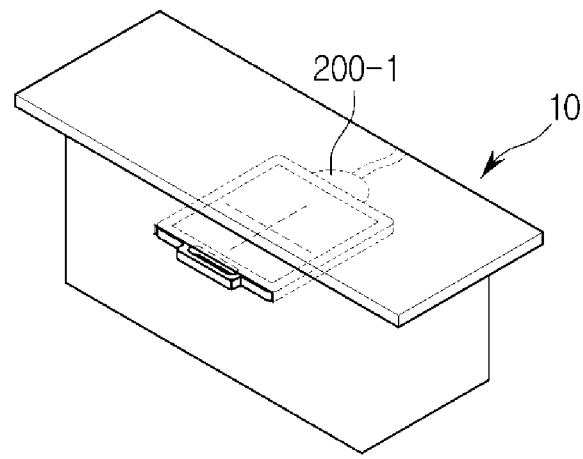

As described above, the X-ray detector 300 may operate in the table mode, in the stand mode, or in the portable mode in order to detect X-rays. The locations of the X-ray detector 300 in the individual radiography modes will be described with reference to FIGS. 7, 8, and 9, below. FIG. 7 is a view for describing a method in which the X-ray detector 300 of the X-ray imaging apparatus 1 according to an exemplary embodiment is installed in a radiography table, FIG. 8 is a view for describing a method in which the X-ray detector 300 of the X-ray imaging apparatus 1 according to an exemplary embodiment is installed in a radiography stand, and FIG. 9 shows a case in which the X-ray detector 300 of the X-ray imaging apparatus 1 according to an exemplary embodiment is used in a portable mode.

A plurality of coupling modules 200 may be provided to correspond to the respective radiography modes. Referring to FIGS. 7, 8, and 9, the coupling modules 200 may include a table coupling module 200-1 which corresponds to the table mode, a stand coupling module 200-2 which corresponds to the stand mode, and a portable coupling module 200-3 which corresponds to the portable mode. However, the locations and numbers of the coupling modules 200 are only exemplary. In particular, only the table coupling module 200-1 and the stand coupling module 200-2 may be provided, or four coupling modules or more may be provided. In the current exemplary embodiment, it is assumed that the coupling modules 200 include the table coupling module 200-1, the stand coupling module 200-2, and the portable coupling module 200-3.

Referring to FIG. 7, the table coupling module 200-1 may be installed in the first accommodation slot 15. In order to perform radiography on an object that lies on the radiography table 10, the X-ray detector 300 may be installed in the radiography table 10. More specifically, the X-ray detector 300 may be inserted into the first accommodating slot 15 formed in the radiography table 10. When the X-ray detector 300 is inserted into the first accommodating slot 15, the X-ray detector 300 may be inserted in a state of being parallel to a bottom plane, that is, a plane formed by the x-axis and the y-axis, as illustrated in drawing (a) in the top portion of FIG. 7. After the X-ray detector 300 is inserted into the first accommodating slot 15, the X-ray detector 300 may be maintained in the state of being parallel to the bottom plane or the plane formed by the x-axis and the y-axis, as illustrated in drawing (b) in the bottom portion of FIG. 7. Further, the X-ray detector 300 inserted into the first accommodating slot 15 may be connected to the table coupling module 200-1. As such, a state in which the X-ray detector 300 has been inserted into the first accommodating slot 15 and coupled with the table coupling module 200-1 is the table mode.

Figure 8:
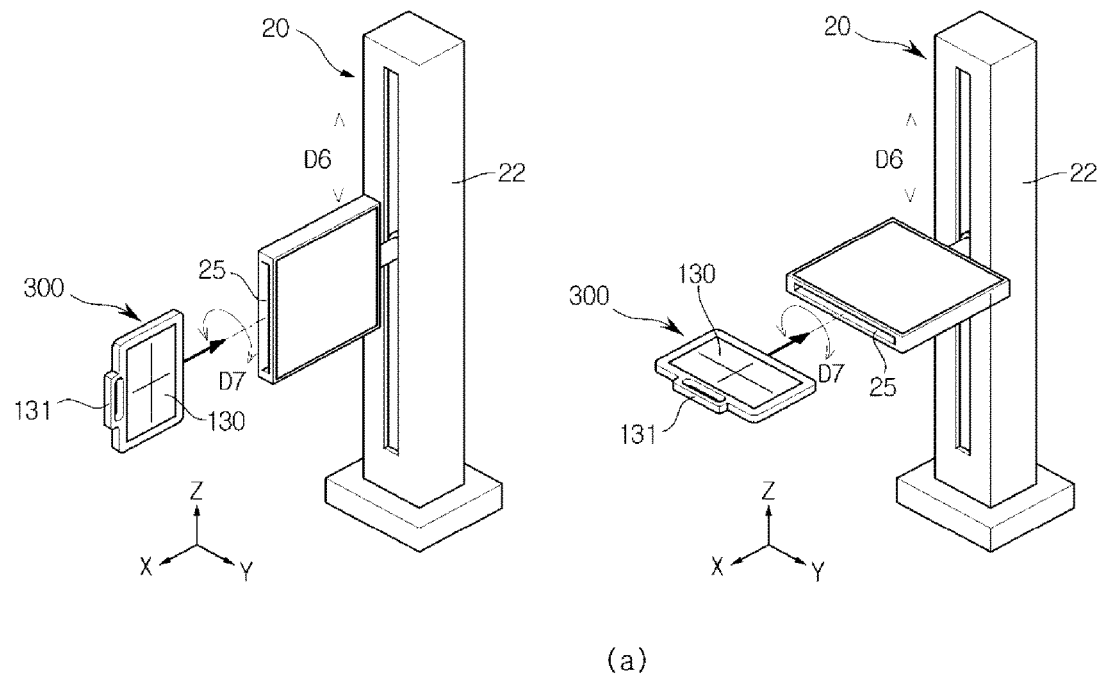
FIG. 8 is a view for describing a method in which an X-ray detector of an X-ray imaging apparatus according to an exemplary embodiment is installed in a radiography stand.
Figure 8:
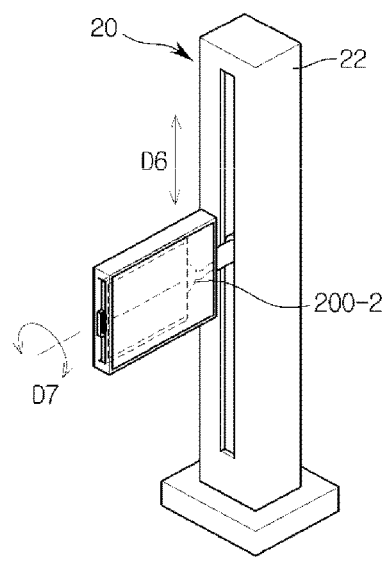
Figure 9:
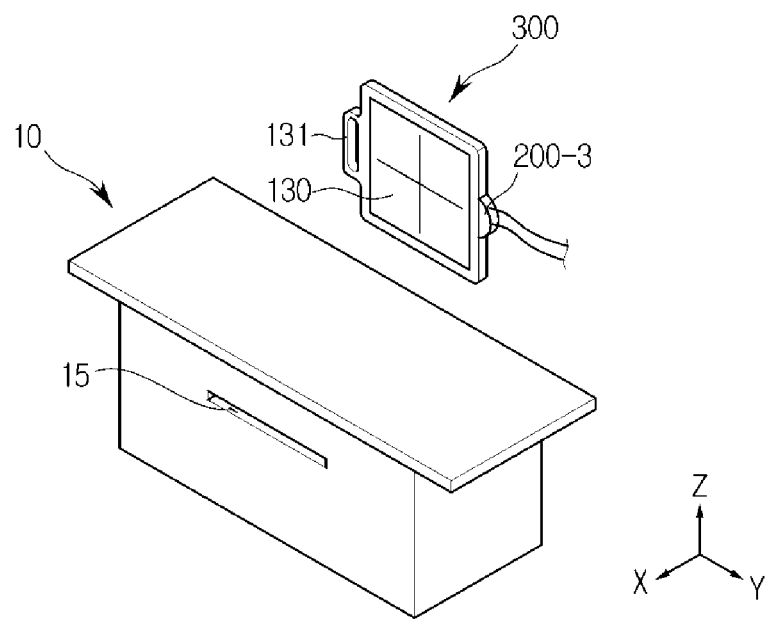
FIG. 9 shows a case in which an X-ray detector of an X-ray imaging apparatus according to an exemplary embodiment is used in a portable mode.

Referring to FIG. 8, the stand coupling module 200-2 may be installed in the second accommodation slot 25. In order to perform radiography on an object that stands in front of the radiography stand 20, the X-ray detector 300 may be installed in the radiography stand 20. More specifically, the X-ray detector 300 may be inserted into the second accommodating slot 25 formed in the radiography stand 20. Because the second accommodating slot 25 is rotatable in the seventh direction D7, the X-ray detector 300 may be inserted into the second accommodating slot 25 in a state of being perpendicular to a bottom plane or parallel to a plane formed by the x-axis and the z-axis, as illustrated in the left side of drawing (a) in the top portion of FIG. 8, or the X-ray detector 300 may be inserted into the second accommodating slot 25 in a state of being parallel to the bottom plane or parallel to a plane formed by the x-axis and the y-axis, as illustrated in the right side of drawing (a) of FIG. 8. After the X-ray detector 300 is inserted into the second accommodating slot 25, the second accommodating slot 25 may rotate so that the X-ray detector 300 is maintained in a state of being perpendicular to the bottom plane, that is, parallel to the plane formed by the x-axis and the z-axis, as illustrated in drawing (b) in the bottom portion of FIG. 8. Further, the X-ray detector 300 inserted into the second accommodating slot 25 may be connected to the stand coupling module 200-2. As such, a state in which the X-ray detector 300 has been inserted into the second accommodating slot 25 and coupled with the stand coupling module 200-2 is the stand mode.

In order to perform radiography on a moving object, as well as an object that lies or stands, the X-ray detector 300 may be in a portable state, instead of being inserted into the radiography table 10 or the radiography stand 20. This state is the portable mode. As shown in FIG. 9, in the portable mode, the X-ray detector 300 may be coupled with the portable coupling module 200-3, and the portable coupling module 200-3 may be placed at an arbitrary location at which radiography can be easily performed in the portable mode. For example, as illustrated in FIG. 9, the portable coupling module 200-3 may be placed in the backside of the top plate of the radiography table 10.

Figure 10:
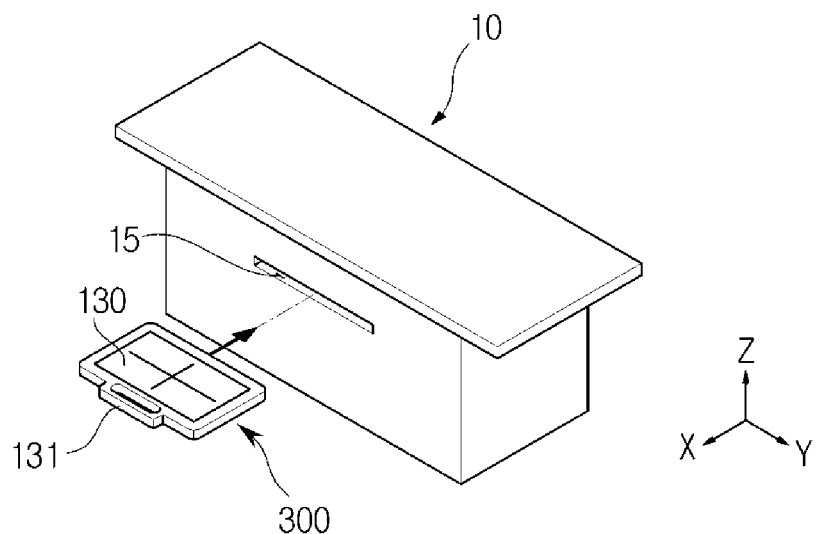
FIGS. 10, 11, and 12 show other examples relating to positions of a table coupling module, a stand coupling module, and a portable coupling module, in an X-ray imaging apparatus according to an exemplary embodiment.
Figure 10:
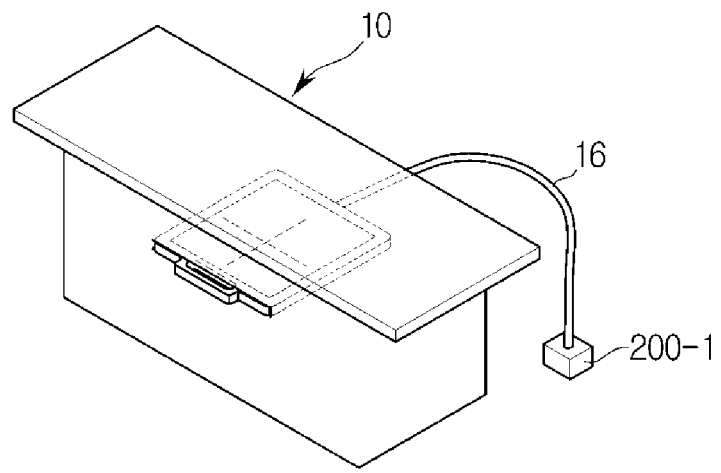
Figure 11:
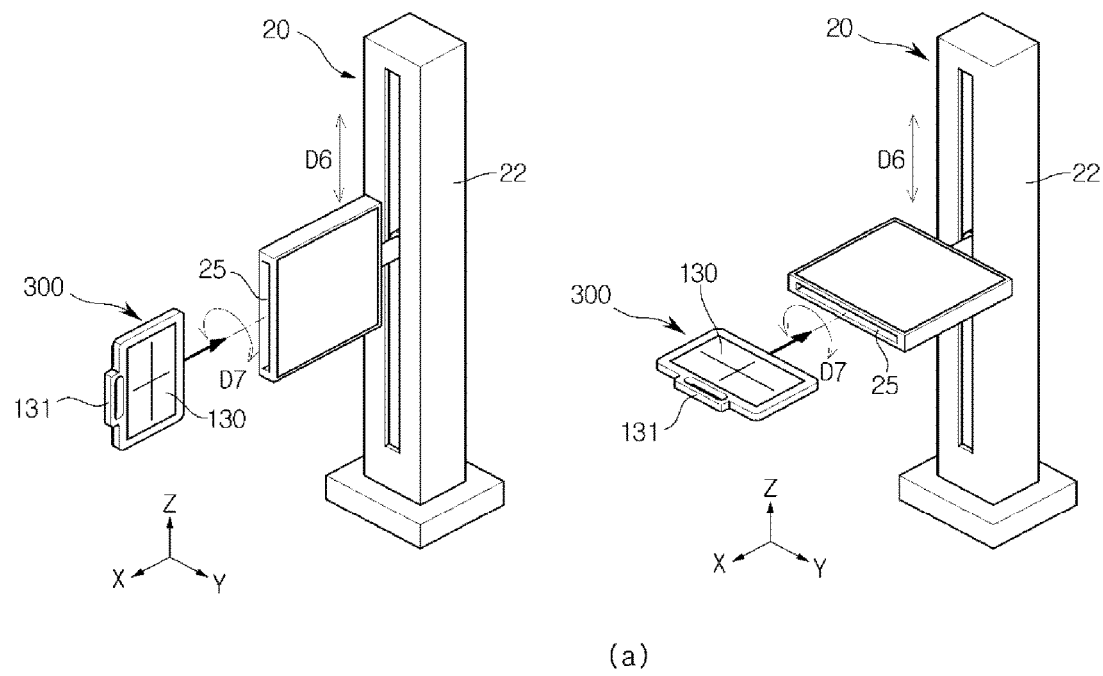
Figure 11:
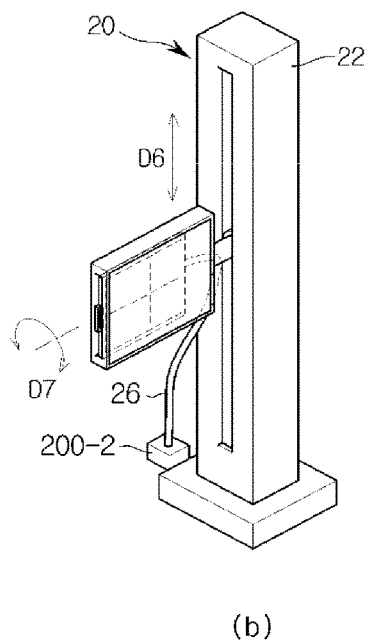
Figure 12:
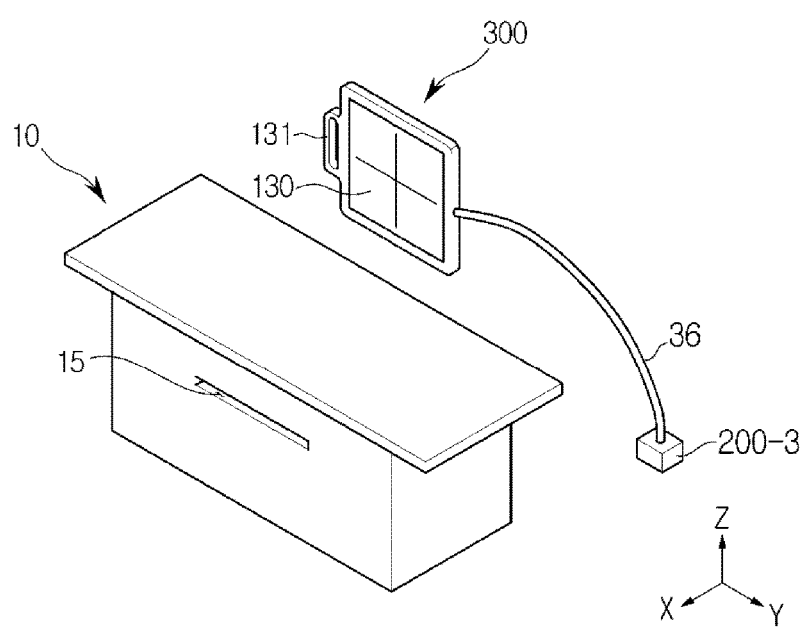

FIGS. 10, 11, and 12 show other examples which relate to positions of the table coupling module 200-1, the stand coupling module 200-2, and the portable coupling module 200-3, in the X-ray imaging apparatus 1 according to an exemplary embodiment.

Referring to FIG. 10, the table coupling module 200-1 may be located outside the first accommodation slot 15, and coupled with the X-ray detector 300 inserted in the first accommodation slot 15 via a cable 16. The table coupling module 200-1 may be located adjacent to the radiography table 10 in order to be coupled with the X-ray detector 300.

Referring to FIG. 11, the stand coupling module 200-2 may be located outside the second accommodation slot 25, and coupled with the X-ray detector 300 inserted in the second accommodation slot 25 via a cable 26. The stand coupling module 200-2 may be located adjacent to the radiography stand 20 in order to be coupled with the X-ray detector 300.

Referring to FIG. 12, the portable coupling module 200-3 may be coupled with the X-ray detector 300 via a cable 36, in the portable mode.

Further, if the X-ray detector 300 receives a supply voltage in a wired fashion and is connected to a workstation in a wired fashion, each coupling module 200 may function to connect the X-ray detector 300 to an external power supply and a network hub. Alternatively, each coupling module 200 may be implemented as a board on which electrical devices are mounted, separately from a configuration of connecting the X-ray detector 300 to an external power supply and a network hub. Hereinbelow, a configuration of the coupling module 200 will be described in detail.

First, a case in which the coupling module 200 includes a configuration of connecting the X-ray detector 300 to an external power supply and a network hub will be described. In this case, the coupling module 200 may be called a power box. However, the coupling module 200 is defined by its configuration and operation, not by its name.

Figure 13:
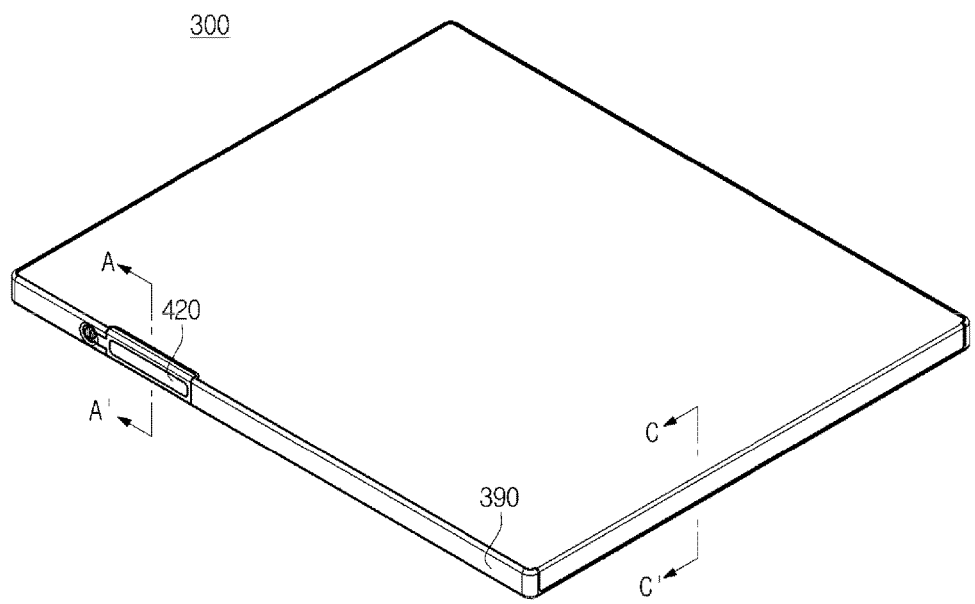
FIG. 13 is a perspective view of an X-ray detector of an X-ray imaging apparatus, according to an exemplary embodiment.
Figure 14:
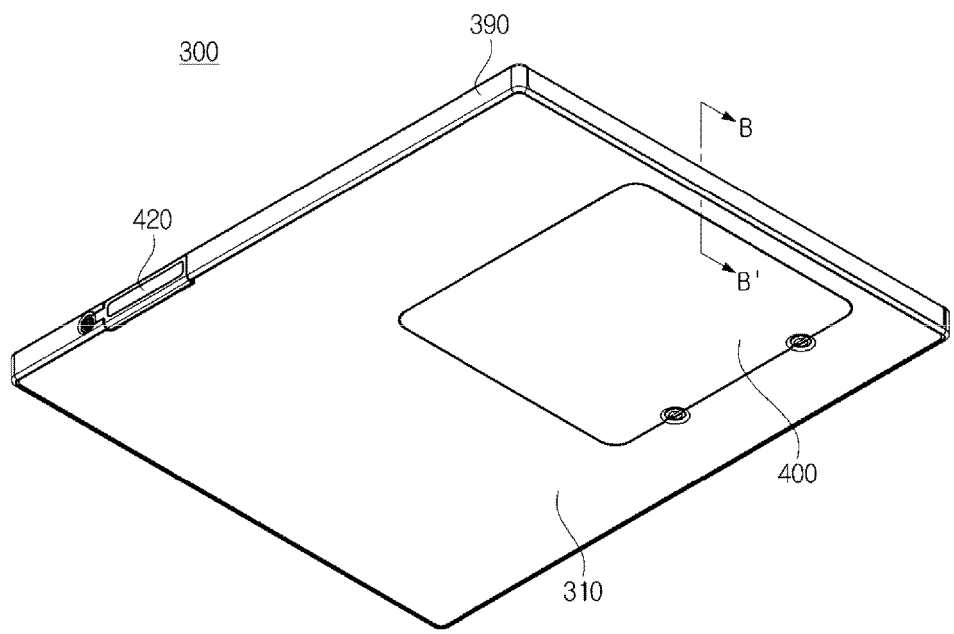
FIG. 14 is a bottom perspective view of an X-ray detector of an X-ray imaging apparatus, according to an exemplary embodiment.
Figure 15:
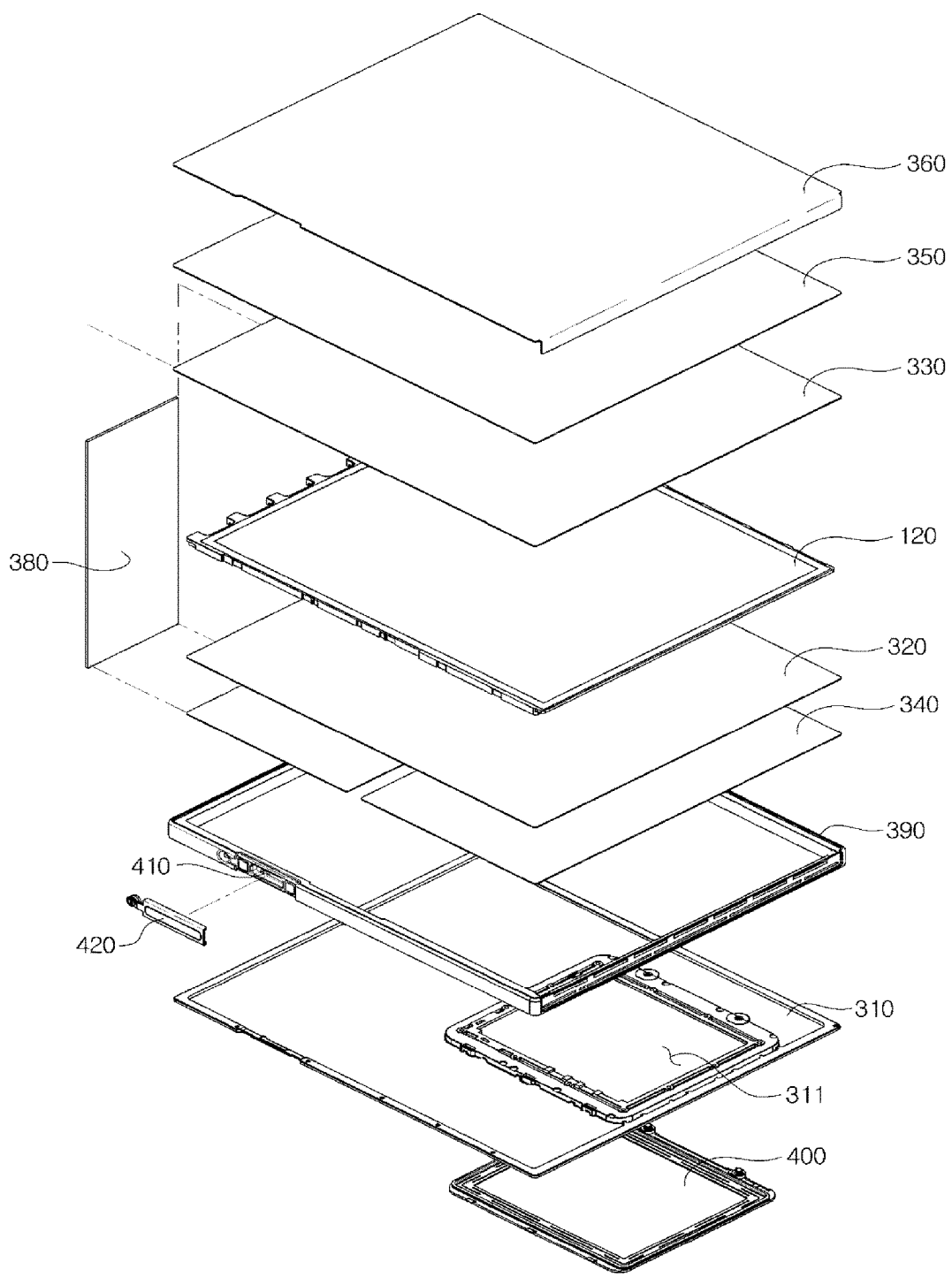
FIG. 15 is an exploded perspective view of an X-ray detector of an X-ray imaging apparatus, according to an exemplary embodiment.

FIG. 13 is a perspective view of the X-ray detector 300 of the X-ray imaging apparatus 1 according to an exemplary embodiment, FIG. 14 is a bottom perspective view of the X-ray detector 300 of the X-ray imaging apparatus 1 according to an exemplary embodiment, and FIG. 15 is an exploded perspective view of the X-ray detector 300 of the X-ray imaging apparatus 1 according to an exemplary embodiment. In the following description, foreign materials may include dust, blood, liquid, and the like.

As shown in FIGS. 13, 14, and 15, the X-ray detector 300 may be used to detect X-rays irradiated from the X-ray source 70 (see FIGS. 1 and 2). The X-ray detector 300 may include an insulating substrate 320. The X-ray detector 300 may further include a sensing panel 120. The X-ray detector 300 may further include a scintillator 330. The X-ray detector 300 may further include a circuit board 340. The insulating substrate 320 may support the sensing panel 120 and the scintillator 330. The sensing panel 120 may rest on one surface of the insulating substrate 320, and the scintillator 330 may rest on one surface of the sensing panel 120. The circuit board 340 may convert incident X-rays into visible light. A cover (350) for protecting the scintillator 330 may be provided on one surface of the scintillator 330. The cover 350 may be made of a metal material, such as, for example, aluminum.

On the upper surface of the scintillator 350, a top frame 360 may be positioned. The top frame 360 may include a carbon plate. On one surface of the top frame 360, a deco sheet (not shown) may be provided.

The sensing panel 120 may include a plurality of pixels 150 (see FIG. 5), and each pixel 150 may include a photoelectric conversion device, such as a thin-film transistor or a photodiode. The sensing panel 120 may read out an intensity of light which passes through the scintillator 330 in unit of pixels. The sensing panel 120 may include an electrical circuit which is configured to transfer outputs from the photoelectric conversion device to the outside.

The circuit board 340 may perform calculations for acquiring an image of an object using data that is acquired based on signals read by the sensing panel 120. The circuit board 340 may be accommodated in the X-ray detector 300 in order to control driving of the X-ray detector 300. The circuit board 340 may include a memory and a calculator. The memory may store shadow information of an object according to incident angles of X-rays, and the calculator may calculate an incident angle of X-rays, based on a shadow shape of the object formed on the sensing panel 120 and the shadow information stored in the memory. The memory and the calculator may be located outside the X-ray detector 300.

The sensing panel 120 may be electrically connected to the circuit board 340. More specifically, the sensing panel 120 may be electrically connected to the circuit board 340 via a flexible printed circuit board 380. The flexible printed circuit board 380 may include a read-out terminal (not shown) which is configured for reading out information of the sensing panel 120.

The X-ray detector 300 may further include the top frame 360, a side frame 390, and a bottom frame 310 that are mutually coupled with each other to form an outer appearance of the X-ray detector 300. The top frame 360 may form a top appearance of the X-ray detector 300. The side frame 390 may form a side appearance of the X-ray detector 300. The bottom frame 310 may form a bottom appearance of the X-ray detector 300.

In the inside of the X-ray detector 300, an accommodation space may be formed. The insulating substrate 320, the sensing panel 120, the scintillator 330, and the circuit board 340 may be accommodated in the accommodation space. In this aspect, the top frame 360, the side frame 390, and the bottom frame 310 may be coupled with each other to form an accommodation space in which the insulating substrate 320, the sensing panel 120, the scintillator 330, and the circuit board 340 can be accommodated. The insulating substrate 320, the sensing panel 120, the scintillator 330, the circuit board 340, etc. may be protected from external impacts by the top frame 360, the side frame 390, and the bottom frame 310. The bottom frame 310 may be made of the same material as the top frame 360.

The X-ray detector 300 may further include a battery (not shown) that is accommodated in the accommodation space.

The X-ray detector 300 may further include a battery cover 400 which is configured to open or close a part of the accommodation space in order to separate the battery accommodated in the accommodation space. The battery cover 400 may be detachably coupled with the lower part of the bottom frame 310.

The X-ray detector 300 may further include a terminal 410 to which the coupling module 200 is connected. The terminal 410 may be provided in the X-ray detector 300 with which the coupling module 200 can be coupled. In particular, the terminal 410 may be provided in the X-ray detector 300 so that the coupling module 200 can be coupled with the X-ray detector 300 and electrically connected to the circuit board 340. In this aspect, the coupling module 200 may be electrically connected to the circuit board 340 via coupling with the terminal 410. More specifically, the terminal 410 may be formed in one side of the side frame 390. The terminal 410 will be described in more detail below.

The X-ray detector 300 may further include a cap 420 which is configured to prevent foreign materials from entering the terminal 410 with which the coupling module 200 is coupled. The cap 420 will also be described in more detail below.

Figure 16:
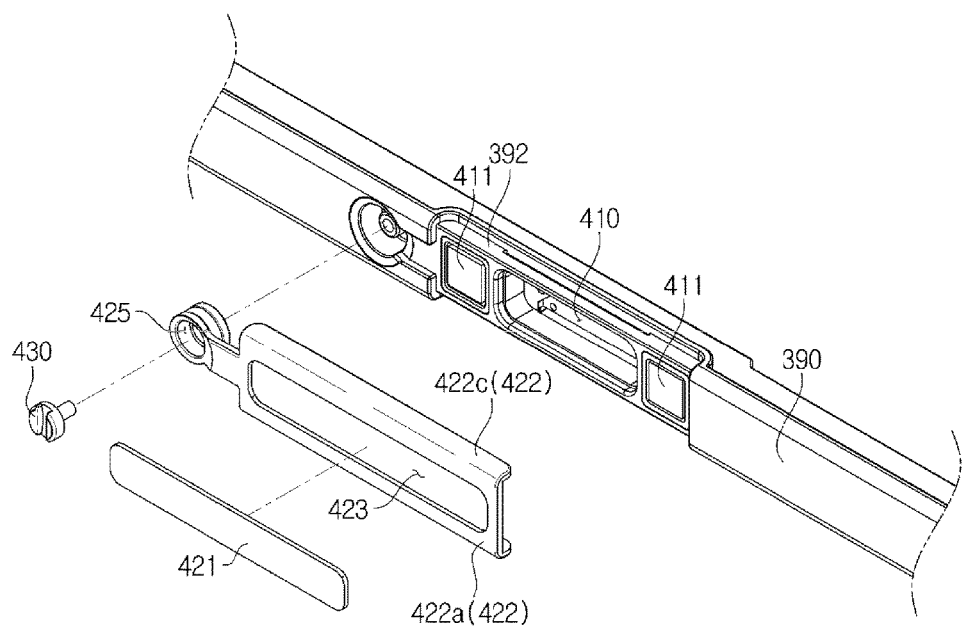
FIG. 16 is an exploded perspective view showing a cap of an X-ray imaging apparatus, according to an exemplary embodiment.
Figure 17:
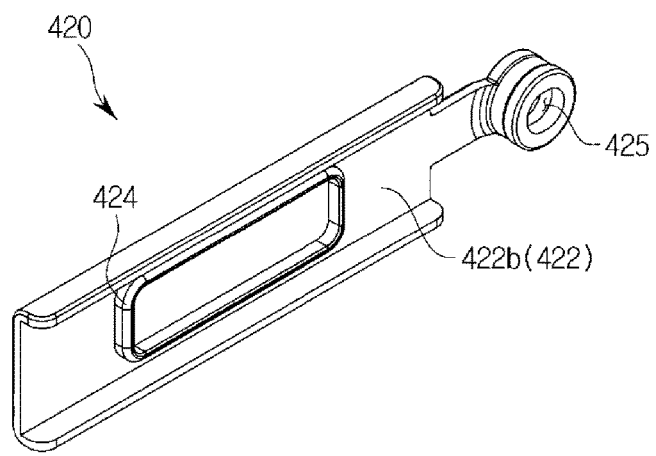
FIG. 17 shows the inside of a cap of an X-ray imaging apparatus, according to an exemplary embodiment.
Figure 18:
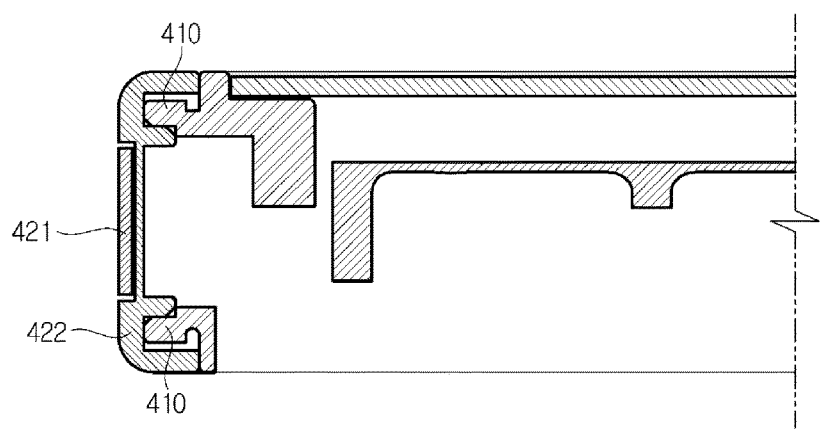
FIG. 18 is a cross-sectional view of the X-ray detector shown in FIG. 13 cut along a line A-A', showing a first coupling structure between a terminal of the X-ray detector and a cap, in an X-ray imaging apparatus according to an exemplary embodiment.

FIG. 16 is an exploded perspective view showing the cap 420 of the X-ray imaging apparatus 1 according to an exemplary embodiment, FIG. 17 shows the inside of the cap 420 of the X-ray imaging apparatus 1 according to an exemplary embodiment, and FIG. 18 is a cross-sectional view of the X-ray detector 300 shown in FIG. 13 cut along a line A-A', showing a first coupling structure between the terminal 410 of the X-ray detector 300 and the cap 420, in the X-ray imaging apparatus 1 according to an exemplary embodiment. In the following description, foreign materials may include dust, blood, liquid, and the like.

As shown in FIGS. 16, 17, and 18, the X-ray detector 300 may further include the terminal 410 with which the coupling module 200 is coupled. The terminal 410 may be formed in one side of the side frame 390. The terminal 410 may have magnetism. Accordingly, the coupling module 200 may be coupled with the terminal 410 by the magnetism. More specifically, the coupling module 200 may include a magnetic substance (not shown) which has a different polarity from that of the terminal 410 so as to be coupled with the terminal 410.

The X-ray detector 300 may further include the cap 420 which is configured to prevent foreign materials from entering the terminal 410 with which the coupling module 200 is coupled. In particular, the X-ray detector 300 may further include the cap 420 for which at least one end is fixed at the X-ray detector 300 to regulate an opening or closing the terminal 410 in order to prevent foreign materials from entering the terminal 410. However, the cap 420 may be not necessarily fixed at the X-ray detector 300 at its at least one end, as long as the cap 420 can regulate the opening or closing of the terminal 410.

The cap 420 may be coupled with the side frame 390 in order to regulate the opening or closing of the terminal 410 with which the coupling module 200 is coupled. At least one end of the cap 420 may be fixed at the side frame 390. More specifically, one end of the cap 420 may be fixed at the side frame 390 by a fixing member 430, such as, for example, a bolt. The cap 420 may be fixed at the side frame 390 at its one end to rotate with respect to the fixing member 430. The cap 420 may be detachably coupled with the X-ray detector 300 by magnetism so as to regulate the opening or closing of the terminal 410. In particular, one end of the cap 420 may be fixed at the side frame 390 by the fixing member 430, and the other end of the cap 420 may be detachably coupled with the side frame 390 by magnetism in order to regulate the opening or closing of the terminal 410. The other end of the cap 420 may be detachably attached on at least one magnetic substance 411 disposed on the side frame 390 by magnetism so as to be located adjacent to the terminal 410.

The cap 420 may include a metal member 421.

The metal member 421 may interact with the at least one magnetic substance 411 disposed within close proximity to the terminal 410. The metal member 421 may be made of, for example, stainless steel.

The cap 420 may further include a sealing member 422. The sealing member 422 may be coupled with the metal member 421. The sealing member 422 may surround at least one part of the metal member 421. The sealing member 422 may be made of rubber or silicon. However, the sealing member 422 may be made of any other material, provided that it has elasticity.

The sealing member 422 may include a first surface 422a which faces the outside of the X-ray detector 300, and a second surface 422b which faces the inside of the X-ray detector 300. The first surface 422a may be opposite to the second surface 422b. The second surface 422b may face the terminal 410. The first surface 422a may include a first coupling part 423 with which the metal member 421 can be coupled. The second surface 422b may include a second coupling part 424 which protrudes toward the inside of the X-ray detector 300 to be coupled with the terminal 410. In particular, the second surface 422b may include the second coupling part 424 which protrudes toward the terminal 410 so as to tightly contact the inner surfaces of the terminal 410. The cap 420 may be tightly coupled with the terminal 410 in order to prevent foreign materials from entering the terminal 410 through a gap between the cap 420 and the terminal 410. In this aspect, the second coupling part 424 may be coupled with the terminal 410 such the outer surfaces of the second coupling part 424 can tightly contact the inner surfaces of the terminal 410.

The sealing member 422 may further include a fixing hole 425 through which the fixing member 430 can penetrate. The fixing member 430 may penetrate through the fixing hole 425 of the sealing member 422 so as to fix one end of the cap 420 at the side frame 390.

The sealing member 422 may further include a bent part 422c. The bent part 422c may extend toward the inside of the X-ray detector 300. For example, the bent part 422c may include a first bent part which extends from the upper edge of the sealing member 422 toward the inside of the X-ray detector 300, and a second bent part which extends from the lower edge of the sealing member 422 toward the inside of the X-ray detector 300.

In the side frame 390, a resting part 392 that is recessed may be formed so that the bent part 422c can rest thereon. For example, the resting part 392 may include a first resting part that is recessed from the upper edge of the side frame 390 so that the first bent part can rest thereon, and a second resting part that is recessed from the lower edge of the side frame 390 so that the second bent part can rest thereon.

Figure 19:
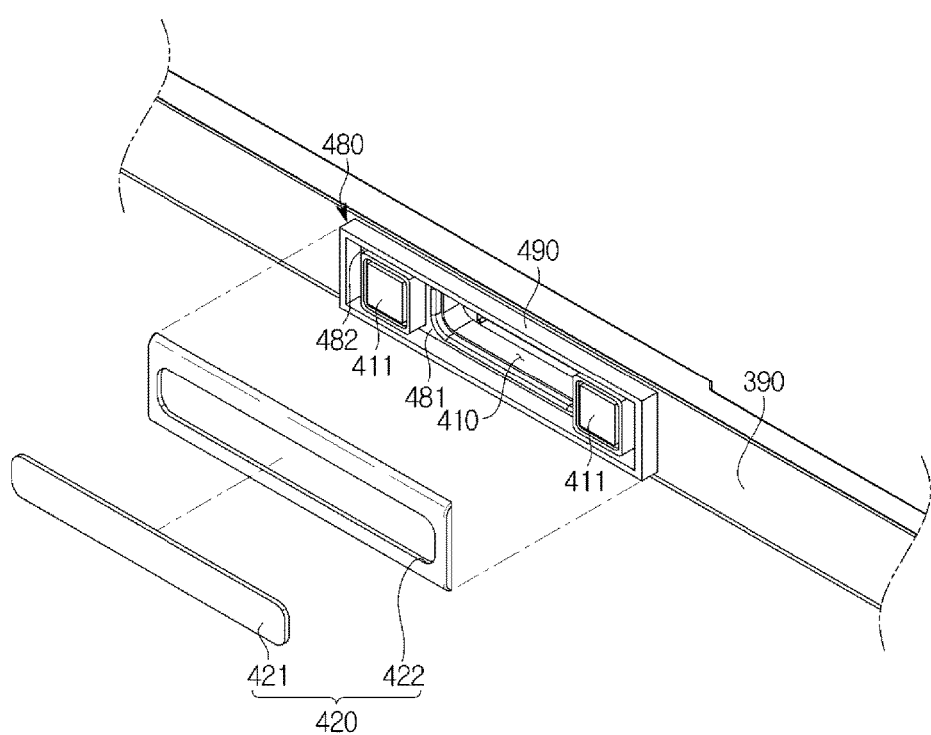
FIG. 19 shows a second coupling structure between a terminal of an X-ray detector and a cap, in an X-ray imaging apparatus according to an exemplary embodiment.

FIG. 19 shows a second coupling structure between the terminal 410 of the X-ray detector 300 and the cap 420, in the X-ray imaging apparatus 1 according to an exemplary embodiment. Hereinbelow, the same descriptions as those about the first coupling structure between the terminal 410 of the X-ray detector 300 and the cap 420 will be omitted.

The X-ray detector 300 may further include a dam structure. The dam structure may be formed in any one of the cap 420 and the side frame 390. More specifically, the dam structure may be formed in any one of the cap 420 and a cap installation part 480 formed in the side frame 390. The cap installation part 480 may be formed in the side frame 390 so that the cap 420 can be detachably coupled with the side frame 390. The dam structure may be in the shape of a rib. The dam structure may reduce a contact area between the cap 420 and the cap installation part 480, and concentrate compression power between the cap 420 and the cap installation part 480, thereby maximally preventing foreign materials from entering the terminal 410. Hereinbelow, a case in which the dam structure is formed in the cap installation part 480, as shown in FIG. 19, will be described.

As shown in FIG. 19, the cap installation part 480 may include a first area 481 and a second area 482. In the first area 481, the terminal 410 and at least one magnetic substance 411 may be disposed. The second area 482 may be provided along the outer edge of the first area 481. In the second area 482, a rib 490 which protrudes outward from the X-ray detector 300 may be disposed. The rib 490 may surround the first area 481. In particular, the rib 490 may be in the shape of a closed curve surrounding the first area 481. However, the shape of the rib 490 is not limited to a closed curve, and various modifications are possible.

The cap 420 may include a metal member 421 and a sealing member 422. The metal member 421 may interact with the at least one magnetic substance 411. The sealing member 422 may surround at least one part of the metal member 421. The sealing member 422 may line-contact the rib 490 when the cap 420 is coupled with the cap installation part 480.

Figure 20:
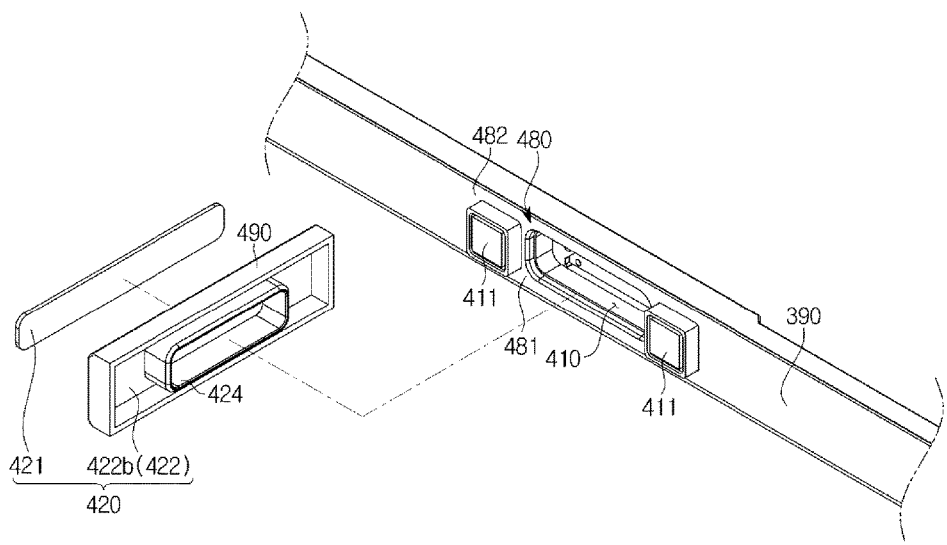
FIG. 20 shows a third coupling structure between a terminal of an X-ray detector and a cap, in an X-ray imaging apparatus according to an exemplary embodiment.

FIG. 20 shows a third coupling structure between the terminal 410 of the X-ray detector 300 and the cap 420, in the X-ray imaging apparatus 1 according to an exemplary embodiment. Hereinafter, the same descriptions as those about the first and second coupling structures between the terminal 410 of the X-ray detector 300 and the cap 420 will be omitted. In the third coupling structure, the dam structure is formed in the cap 420, as shown in FIG. 20.

As shown in FIG. 20, the rib 490 may be formed in the cap 420, and protrude toward the inside of the X-ray detector 300. More specifically, the rib 490 may be formed in the sealing member 422, and protrude toward the inside of the X-ray detector 300. The rib 490 may be formed in the second surface 422b of the sealing member 422 which faces the inside of the X-ray detector 300. The rib 490 may be formed outside the second coupling part 424. The second area 482 of the cap installation part 480 may line-contact the rib 490 when the cap 420 is coupled with the cap installation part 480.

Figure 21:
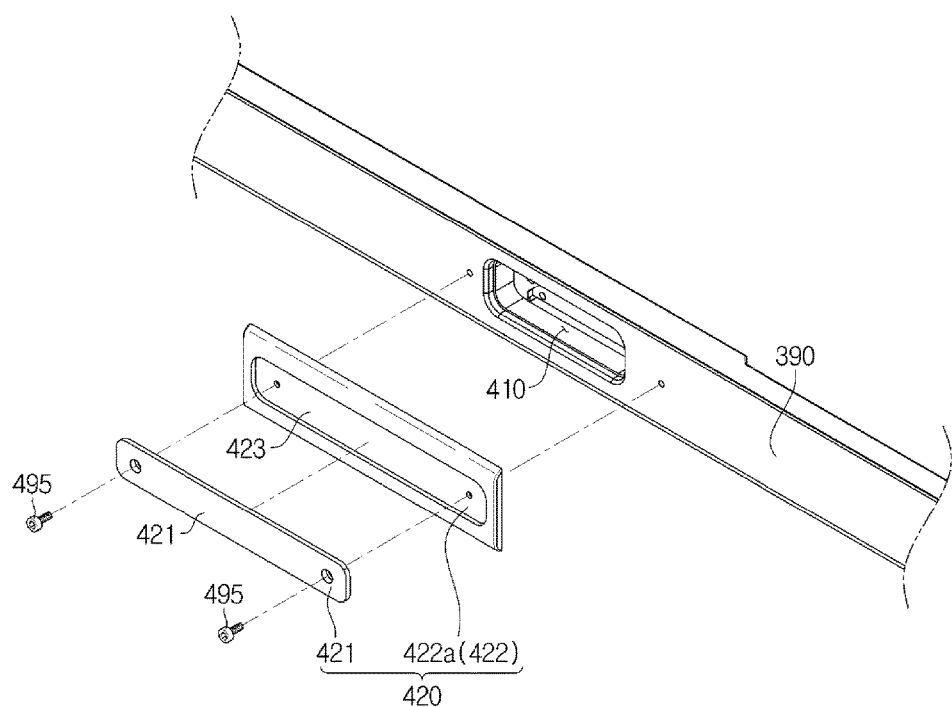
FIG. 21 shows a fourth coupling structure between a terminal of an X-ray detector and a cap, in an X-ray imaging apparatus according to an exemplary embodiment.

FIG. 21 shows a fourth coupling structure between the terminal 410 of the X-ray detector 300 and the cap 420, in the X-ray imaging apparatus 1 according to an exemplary embodiment. Hereinbelow, the same descriptions as those about the first coupling structure between the terminal 410 of the X-ray detector 300 and the cap 420 will be omitted.

As shown in FIG. 21, the cap 420 may be fixed at the side frame 390 by a fixing screw 495 in order to cover the terminal 410. In this case, the at least one magnetic substance 411 may be not needed.

The cap 420 may include the metal member 421 and the sealing member 422 to surround at least one part of the metal member 421. The metal member 421 may be coupled with the first coupling part 423 formed in the first surface 422a of the sealing member 422. The fixing screw 495 may penetrate through the cap 420 and be fixed at a part of the side frame 390 adjacent to the terminal 410. More specifically, the fixing screw 495 may penetrate through the metal member 421 of the cap 420 and the first coupling part 423 with which the metal member 421 is coupled, and be fixed at a part of the side frame 390 adjacent to the terminal 410.

Figure 22:
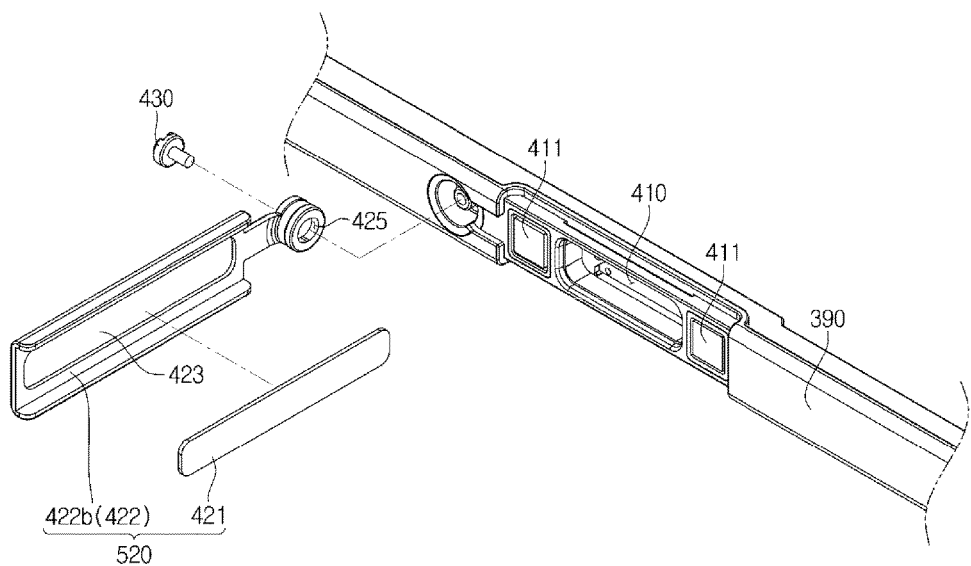
FIG. 22 shows a cap of an X-ray imaging apparatus, according to another exemplary embodiment.

FIG. 22 shows a cap of an X-ray imaging apparatus, according to another exemplary embodiment. Hereinbelow, the same descriptions as those about the cap 420 will be omitted.

As shown in FIG. 22, a cap 520 may include the metal member 421 to interact with the at least one magnetic substance 411, and the sealing member 422 to surround at least one part of the metal member 421. The metal member 421 may be coupled with the second surface 422b of the sealing member 422 which faces the inside of the X-ray detector 300 so as to directly contact the at least one magnetic substance 411. In this case, the first coupling part 423 with which the metal member 421 is coupled may be formed in the second surface 422b of the sealing member 422, and the second coupling part 424 to tightly contact the inner surfaces of the terminal 410 may be not needed.

Figure 23:
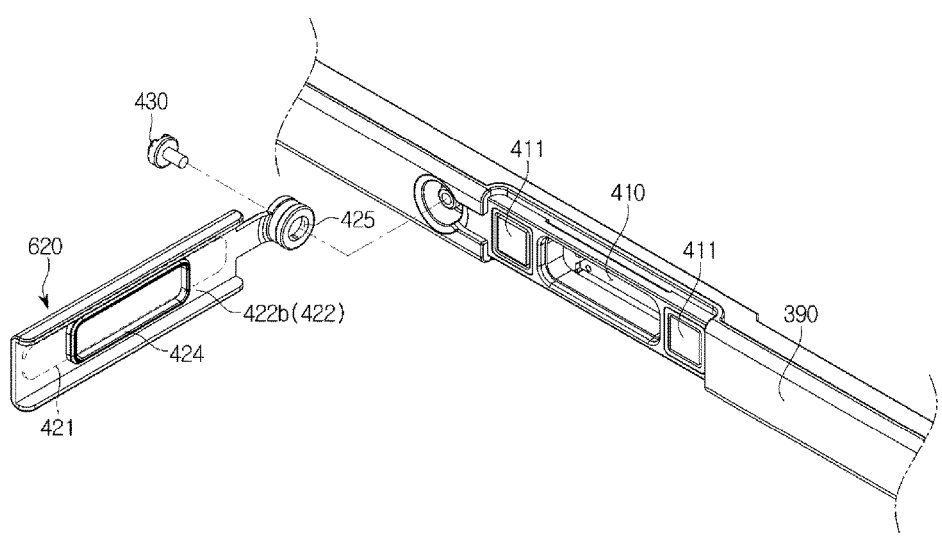
FIG. 23 shows a cap of an X-ray imaging apparatus, according to still another exemplary embodiment.

FIG. 23 shows a cap of an X-ray imaging apparatus, according to still another exemplary embodiment. Hereinbelow, the same descriptions as those about the cap 420 will be omitted.

As shown in FIG. 23, a cap 620 may include the metal member 421 to interact with the at least one magnetic substance 411, and the sealing member 422 in which the metal member 421 is installed. In particular, the sealing member 422 may surround the entire of the metal member 421. In this case, the first coupling part 423 with which the metal member 421 is coupled may be not needed. The second coupling part 424 to tightly contact the inner surfaces of the terminal 410 may be formed on the second surface 422b of the sealing member 422.

The cap 420, 520, or 620 may be formed by integrating the metal member 421 with the sealing member 422 via inserted injection molding.

The cap 420 or 520 may be also formed by coupling the sealing member 422 which is injection-molded with the metal member 421. At this time, the metal member 421 may be attached on the sealing member 422 by an adhesive member.

Figure 24:
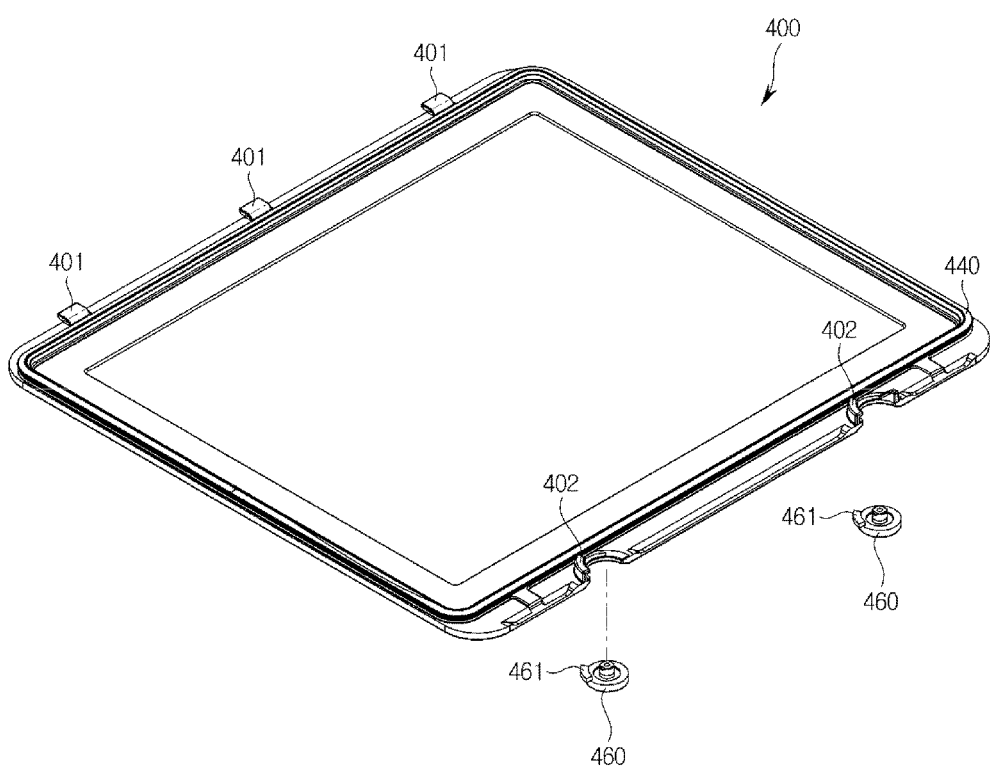
FIG. 24 is a perspective view of a battery cover of an X-ray imaging apparatus, according to an exemplary embodiment.
Figure 25:
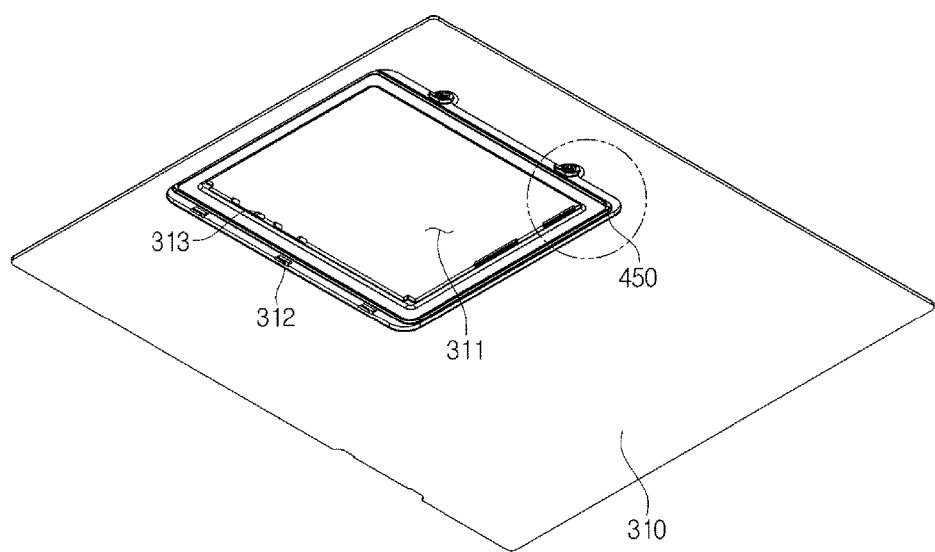
FIG. 25 is a perspective view showing one surface of a bottom frame with which the battery cover of FIG. 24 is coupled.
Figure 26:
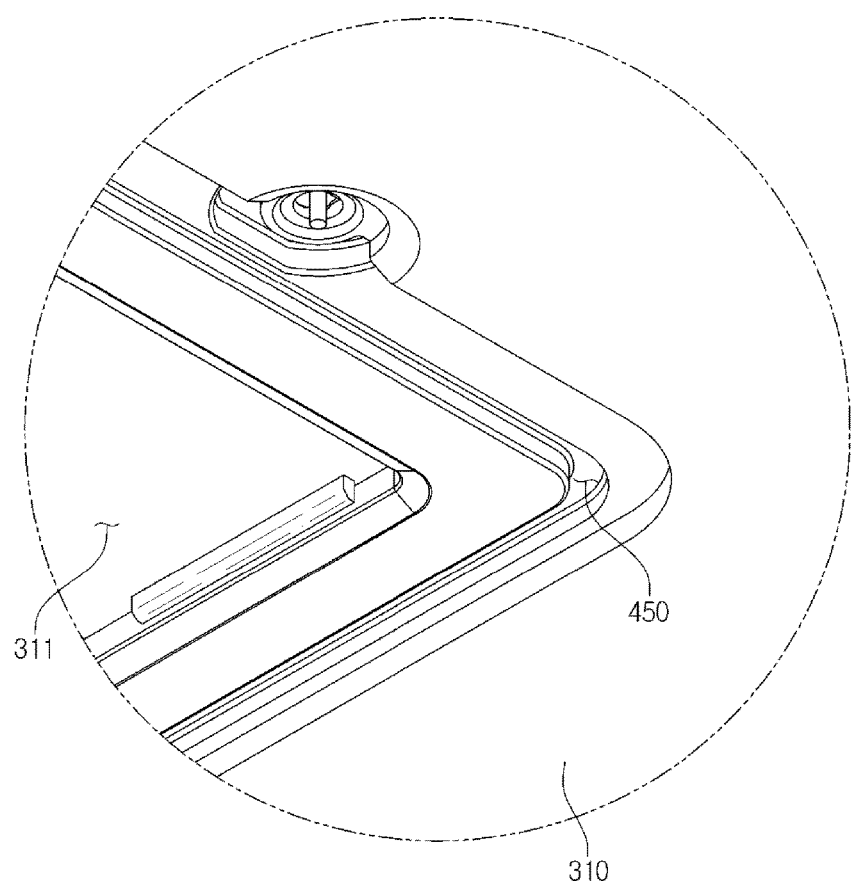
FIG. 26 is an enlarged view of an area of FIG. 25.
Figure 27:
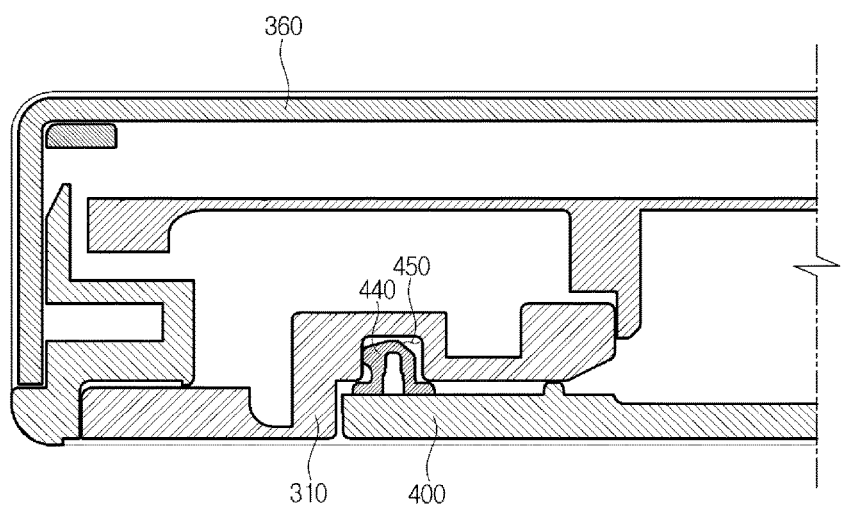
FIG. 27 is a cross-sectional view of the X-ray detector shown in FIG. 14 cut along a line B-B', showing a first coupling structure between a bottom frame and a battery cover, in an X-ray imaging apparatus according to an exemplary embodiment.

FIG. 24 is a perspective view of the battery cover 400 of the X-ray imaging apparatus 1 according to an exemplary embodiment, FIG. 25 is a perspective view showing one surface of the bottom frame 310 with which the battery cover 400 of FIG. 24 is coupled, FIG. 26 is an enlarged view of an area of FIG. 25, and FIG. 27 is a cross-sectional view of the X-ray detector 300 shown in FIG. 14 cut along a line B-B', showing a first coupling structure between the bottom frame 310 and the battery cover 400, in the X-ray imaging apparatus 1 according to an exemplary embodiment. In the following description, foreign materials may include dust, blood, liquid, and the like.

As shown in FIGS. 24, 25, 26, and 27, a foreign material blocking structure which is configured for improving a degree of adhesion between the bottom frame 310 and the battery cover 400 in order to prevent foreign materials from entering a gap between the bottom frame 310 and the battery cover 400 may be provided in the bottom frame 310 and the battery cover 400.

The bottom frame 310 may include a battery accommodation part 311 in which a battery (not shown) can be accommodated. The battery accommodation part 311 may be opened or closed by the battery cover 400. In the inner walls of the battery accommodation part 311, a battery terminal 313 may be provided. If foreign materials enter the battery terminal 313, the battery may fail to electrically connect to the battery terminal 313. In this aspect, electricity energy generated in the battery may be not supplied to the X-ray detector 300. In order to prevent the problem, the battery cover 400 needs to be tightly coupled with the battery accommodation part 311. In order to improve a degree of adhesion between the battery cover 400 and the battery accommodation part 311, a sealing member 440 may be provided between the bottom frame 310 and the battery cover 400. The sealing member 440 may be made of polyurethane. However, the sealing member 440 is not limited to polyurethane, and may be made of any other material which has sufficient elasticity, such as rubber, silicon, and the like.

The sealing member 440 may be disposed on any one of the bottom frame 310 and the battery cover 400. In particular, the sealing member 440 may be disposed on any one of one surface of the bottom frame 310 which faces the battery cover 400 and one surface of the battery cover 400 which faces the bottom frame 310. Preferably, the sealing member 440 may be disposed on one surface of the battery cover 400 which faces the battery accommodation part 311 along the edges of the battery cover 400.

The battery cover 400 may be made of polycarbonate (PC). However, the battery cover 400 is not limited to polycarbonate (PC). The sealing member 440 may be integrated into the battery cover 400 through double injection molding. In addition, the sealing member 440 may be injection-molded and then attached on the battery cover 400 by an adhesive member.

In the bottom frame 310, a coupling groove 450 into which the sealing member 440 can be tightly inserted may be formed. The coupling groove 450 may be formed along the edges of the battery accommodation part 311. In particular, the coupling groove 450 may be formed along the circumference of the battery accommodation part 311. The coupling groove 450 may have a recessed shape into which the sealing member 440 can be inserted.

The battery cover 400 may be inserted into and coupled with the bottom frame 310. More specifically, the battery cover 400 may include at least one coupling rib 401 which is disposed outside the sealing member 440 and which protrudes outward from the battery cover 400. In the bottom frame 310, at least one fixing groove 312 into which the at least one coupling rib 401 can be inserted may be formed. The at least one coupling rib 401 may be inserted into the at least one fixing groove 312 formed in the bottom frame 310 to be located outside the coupling groove 450.

The battery cover 400 coupled with the bottom frame 310 may be fixed at the bottom frame 310 by a coupling member 460.

The coupling member 460 may include a protrusion 461. The protrusion 461 may be formed on one surface of the coupling member 460.

The battery cover 400 may further include at least one coupling part 402 which the protrusion 461 is coupled with or decoupled from according to rotation of the coupling member 460. When the coupling member 460 rotates in a first direction, the protrusion 461 may be interlocked with the coupling part 402 and coupled with the coupling part 402, and when the coupling member 460 rotates in a second direction that is opposite to the first direction, the protrusion 461 may be decoupled from the coupling part 402 so that the interlocked state between the protrusion 461 and the coupling part 402 is released.

As a result, the battery cover 400 may be primarily coupled with the bottom frame 310 by coupling of the at least one coupling rib 401 with the at least one fixing groove 312, and secondarily coupled with the bottom frame 310 by coupling of the protrusion 461 of the coupling member 460 with the coupling part 402.

Figure 28:
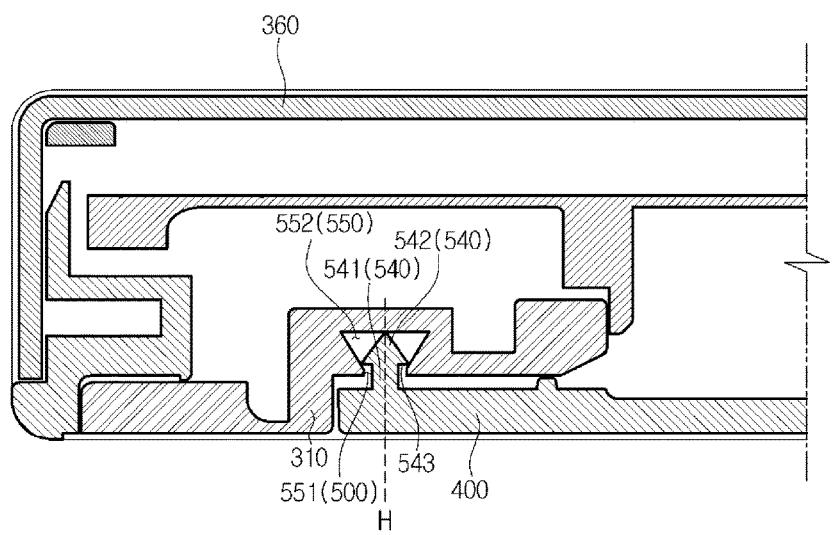
FIG. 28 schematically shows a second coupling structure between a bottom frame and a battery cover, in an X-ray imaging apparatus according to an exemplary embodiment.

FIG. 28 schematically shows a second coupling structure between the bottom frame 310 and the battery cover 400, in the X-ray imaging apparatus 1 according to an exemplary embodiment. Hereinbelow, the same descriptions as those about the first coupling structure between the battery cover 400 and the bottom frame 310 will be omitted. Hereinbelow, a case in which a sealing member 540 is disposed on the batter cover 400 will be described.

As shown in FIG. 28, the sealing member 540 disposed on the battery cover 400 may include a body 541 and a head 542. The body 541 may be coupled with the battery cover 400. The head 542 may be formed at one end of the body 541 to be inserted into a coupling groove 550 formed in the bottom frame 310. In particular, the head 542 may extend from the body 541 to be inserted into the coupling groove 550 formed in the bottom frame 310.

The head 542 may include a catching part 543 formed at an area at which the head 542 extends from the body 541 so that the head 542 has a wider width than the body 541. The catching part 543 may have a shape that is symmetrical with respect to an imaginary axis H which extends in the height direction of the sealing member 540. In this aspect, the head 542 may include a catching part 543 which protrudes in both directions from the body 541 along the width of the body 541.

The coupling groove 550 may have a wider width at a more distant area from its entrance in a direction in which the sealing member 540 is inserted into the coupling groove 550. In particular, a first area 551 that is closer to the entrance of the coupling groove 550 in a direction in which the sealing member 540 is inserted into the coupling groove 550 may have a narrower width than a second area 552 that is more distant from the entrance of the coupling groove 550. When the sealing member 540 is inserted into the coupling groove 550, the catching part 543 of the sealing member 540 may be caught by the first area 551 of the coupling groove 540. When the sealing member 540 is inserted into the coupling groove 550, the catching part 543 of the sealing member 540 may be caught by the first area 551 of the coupling groove 550 by the elastic force of the sealing member 540. If a force that is greater than an elasticity threshold force is applied to at least one of the battery cover 400 and the bottom frame 310, the catching part 543 may be removed from the first area 551 so that the sealing member 540 is removed from the coupling groove 550.

Figure 29:
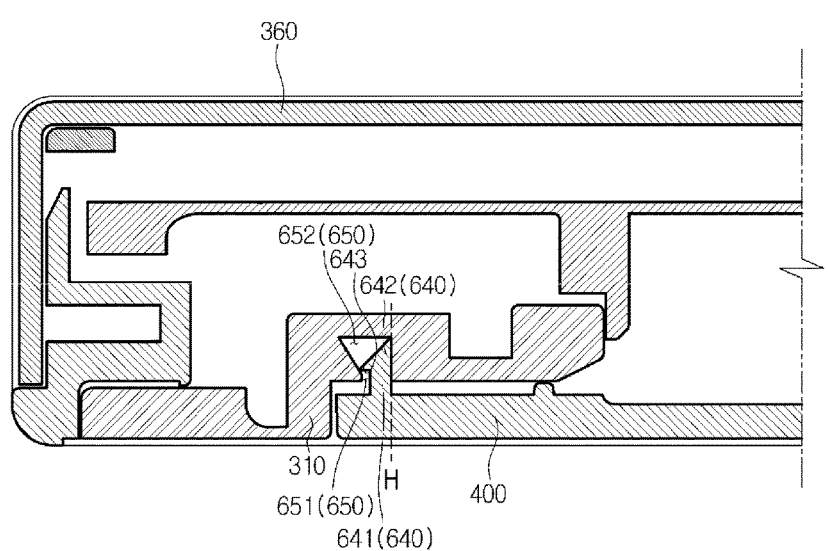
FIG. 29 schematically shows a third coupling structure between a bottom frame and a battery cover, in an X-ray imaging apparatus according to an exemplary embodiment.

FIG. 29 schematically shows a third coupling structure between the bottom frame 310 and the battery cover 400, in the X-ray imaging apparatus 1 according to an exemplary embodiment. Hereinbelow, the same descriptions as those about the first and second coupling structures between the battery cover 400 and the bottom frame 310 will be omitted. Hereinbelow, a case in which a sealing member 640 is disposed on the batter cover 400 will be described.

As shown in FIG. 29, the sealing member 640 disposed on the battery cover 400 may include a body 641 and a head 642. The head 642 may include a catching part 643 formed at an area at which the head 642 extends from the body 641 so that the head 642 has a wider width than the body 641. The catching part 643 may have a shape that is asymmetrical with respect to an imaginary axis H which extends in the height direction of the sealing member 640. In particular, the head 642 may include a catching part 643 which protrudes in one direction from the body 641 along the width of the body 641.

The coupling groove 650 may have a wider width at a more distant area from its entrance in a direction in which the sealing member 640 is inserted into the coupling groove 650. In this aspect, a first area 651 that is closer to the entrance of the coupling groove 650 in a direction in which the sealing member 640 is inserted into the coupling groove 650 may have a narrower width than a second area 652 that is more distant from the entrance of the coupling groove 650.

Figure 30:
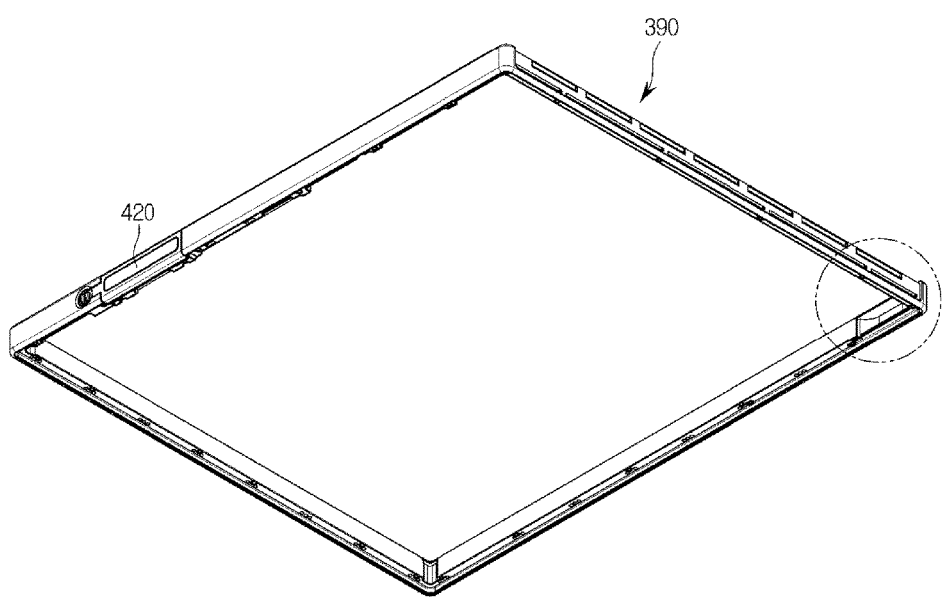
FIG. 30 is a bottom perspective view showing a side frame of an X-ray imaging apparatus, according to an exemplary embodiment.
Figure 31:
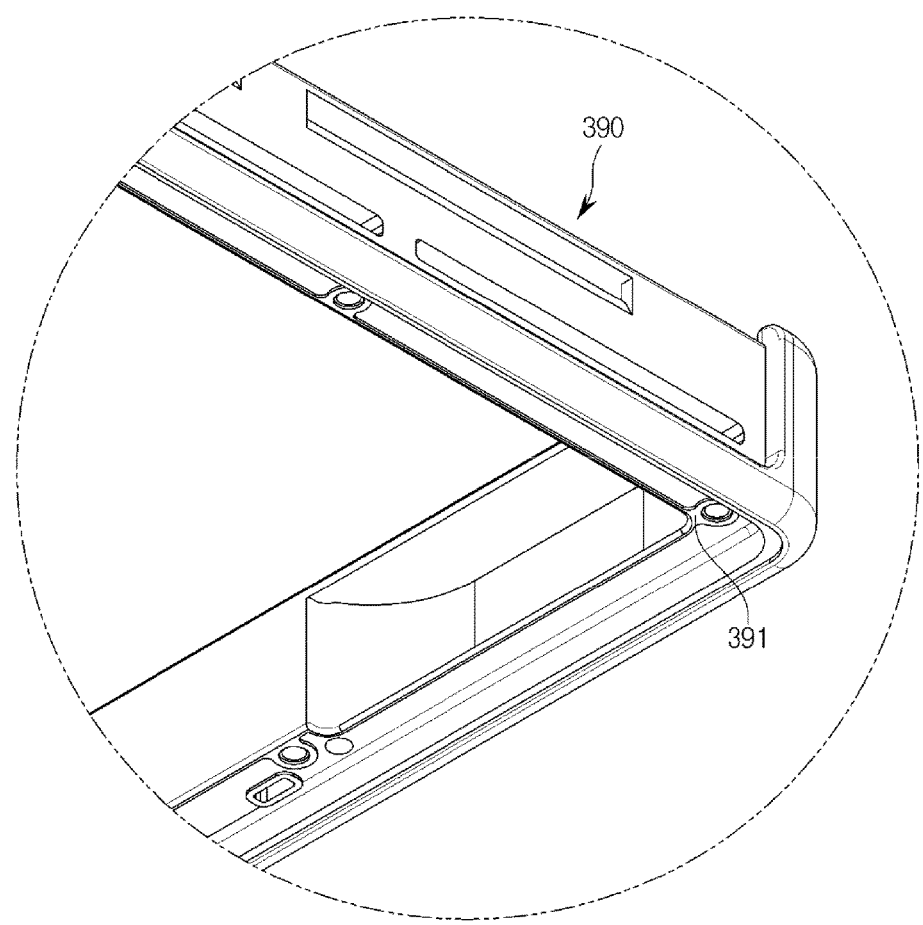
FIG. 31 is an enlarged view of an area of FIG. 30.
Figure 32:
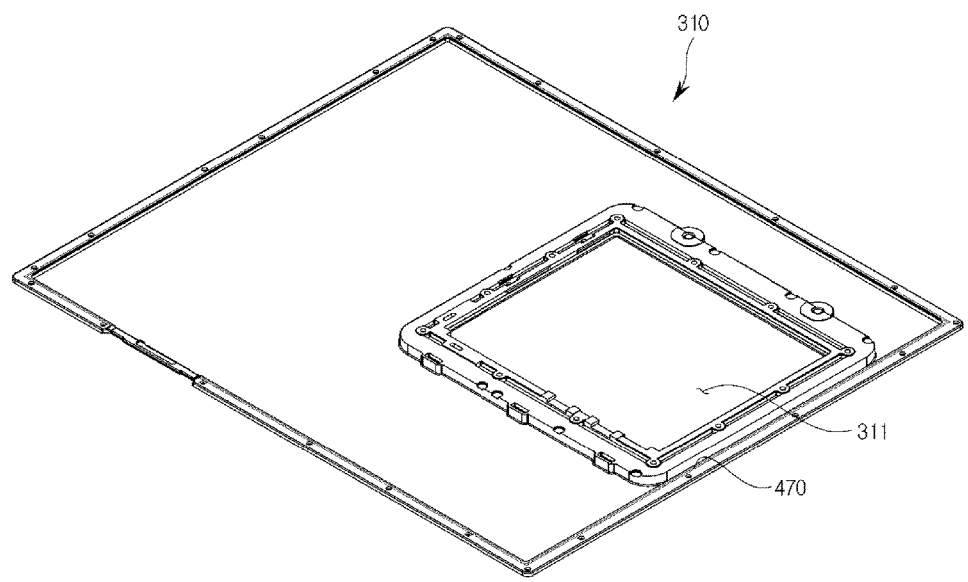
FIG. 32 is a perspective view showing the inner side of a bottom frame of an X-ray imaging apparatus, according to an exemplary embodiment.
Figure 33:
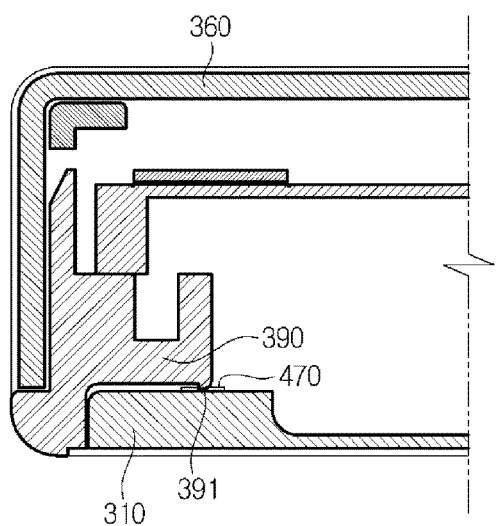
FIG. 33 is a cross-sectional view of the X-ray detector shown in FIG. 13 cut along a line C-C', showing a coupling structure between a bottom frame and a side frame, in an X-ray imaging apparatus according to an exemplary embodiment.

FIG. 30 is a bottom perspective view showing the side frame 390 of the X-ray imaging apparatus 1 according to an exemplary embodiment, FIG. 31 is an enlarged view of an area of FIG. 30, FIG. 32 is a perspective view showing the inner side of the bottom frame 310 of the X-ray imaging apparatus 1 according to an exemplary embodiment, and FIG. 33 is a cross-sectional view of the X-ray detector 300 shown in FIG. 13 cut along a line C-C', showing a coupling structure between the bottom frame 310 and the side frame 390, in the X-ray imaging apparatus 1 according to an exemplary embodiment. In the following description, foreign materials may include dust, blood, liquid, and the like.

As shown in FIGS. 30, 31, 32, and 33, a foreign material blocking structure which is configured for improving a degree of adhesion between the side frame 390 and the bottom frame 310 in order to prevent foreign materials from entering a gap between the side frame 390 and the bottom frame 310 may be provided in the side frame 390 and the bottom frame 310.

The side frame 390 may include a protrusion pattern 391. More specifically, on one surface of the side frame 390 which faces the bottom frame 310, a protrusion pattern 391 which protrudes toward the bottom frame 310 may be formed along the edges of the side frame 390.

An adhesive member 470 may be disposed on the bottom frame 310. The adhesive member 470 may be disposed on the bottom frame 310 to correspond to the protrusion pattern 391 formed on the side frame 390. In particular, the adhesive member 470 may be disposed on the bottom frame 310 so as to contact the protrusion pattern 391 formed on the side frame 390. The adhesive member 470 may be disposed on one surface of the bottom frame 310 which faces the side frame 390 along the edges of the bottom frame 310 so that the adhesive member 470 can be tightly coupled with the protrusion pattern 391.

At least one surface of the adhesive member 470 may have adhesive strength. In this aspect, the adhesive member 470 may be any one of a double-sided adhesive member or a single-sided adhesive member. More specifically, the adhesive member 470 may include a first surface which faces the bottom frame 310, and a second surface which faces the side frame 390. At least one of the first surface and the second surface may have adhesive strength.

The adhesive member 470 may be a waterproof tape.

When the side frame 390 is coupled with the bottom frame 310, the protrusion pattern 391 may press the adhesive member 470. In particular, since the protrusion pattern 391 presses the adhesive member 470, a degree of adhesion between the side frame 390 and the bottom frame 310 can be improved to thereby effectively prevent foreign materials from entering the inside of the X-ray detector 300.

Due to the protrusion pattern 391 formed on the side frame 390, it is possible to effectively prevent foreign materials from entering the inside of the X-ray detector 300. More specifically, when the side frame 390 is coupled with the bottom frame 310, the protrusion pattern 391 may press one surface of the bottom frame 310 which faces the protrusion pattern 391. Accordingly, a degree of adhesion between the side frame 390 and the bottom frame can be improved.

The structure for preventing foreign materials from entering the inside of the X-ray detector 300 will be described in view of another aspect, as follows.

The X-ray imaging apparatus 1 may include a first frame and a second frame that are coupled with each other to form an outer appearance of the X-ray detector 300. The first frame may be tightly coupled with the second frame so that no gap exists between the first frame and the second frame, thereby preventing foreign materials from entering the inside of the X-ray detector 300.

At an area where the first frame is coupled with the second frame, a sealing member may be disposed on the first frame, and a coupling groove into which the sealing member is tightly inserted may be formed in the second frame.

Alternatively, at an area where the first frame is coupled with the second frame, a protrusion pattern may be formed in any one of the first frame and the second frame, and an adhesive member that is tightly coupled with the protrusion pattern may be disposed in the other one of the first frame and the second frame.

The first frame and the second frame may include the side frame 390, the bottom frame 310, and the battery cover 400. However, the first frame and the second frame are not limited to the side frame 390, the bottom frame 310, and the battery cover 400, and may include other components that form the outer appearance of the X-ray detector 300.

The X-ray detector 300 described above can be used in an outdoor environment, as well as in an indoor environment.

As described above, by providing the cap having the sealing member in the terminal of the X-ray detector with which the coupling module is coupled, it is possible to prevent the terminal of the X-ray detector from being exposed to foreign materials.

Further, by disposing the sealing member between the battery cover and the bottom frame with which the battery cover is coupled, it is possible to prevent foreign materials from entering the terminal of the battery.

In addition, by forming the protrusion pattern in the side frame that is coupled with the bottom frame to press the adhesive member disposed along the edges of the bottom frame, it is possible to improve a degree of adhesion between the bottom frame and the side frame.

Although a few exemplary embodiments have been shown and described, it will be appreciated by those of skill in the art that changes may be made in these exemplary embodiments without departing from the principles and spirit of the present inventive concept, the scope of which is defined in the claims and their equivalents.

What is claimed is:

1. An X-ray detector configured to detect X-rays from an X-ray source, the X-ray detector comprising:
    a sensing panel configured to convert the detected X-ray into an electrical signal;
    a circuit board electrically connected to the sensing panel, and configured to control a driving of the X-ray detector;
    a terminal including an opening formed by a plurality of inner surfaces; and
    a cap configured to cover the terminal to prevent a foreign material from entering the terminal, the cap including a first coupling part configured to extend into the opening of the terminal and to contact the plurality of inner surfaces of the terminal, and
    wherein the terminal is formed in a side frame which forms a side appearance of the X-ray detector,
    wherein the cap is configured to be coupled with the side frame by a magnetic force.

2. The X-ray detector according to claim 1, wherein the cap is further configured to be coupled with the terminal to prevent the foreign material from entering the terminal by minimizing a size of a gap between the cap and the terminal.

3. The X-ray detector according to claim 1, wherein a first end of the cap is fixed to the side frame by a fixing member, and a second end of the cap is detachably coupled with the side frame.

4. The X-ray detector according to claim 3, wherein at least one magnetic substance is disposed adjacent to the terminal on the side frame, and
    the cap comprises:
    a metal member configured to interact with the at least one magnetic substance; and
    a sealing member with which the metal member is coupled.

5. The X-ray detector according to claim 4, wherein the sealing member includes a first surface which faces an outside of the X-ray detector, and
    the metal member is coupled with a second coupling part formed in the first surface.

6. The X-ray detector according to claim 4, wherein the sealing member includes a second surface which faces an inside of the X-ray detector so as to face the terminal, and the first coupling part is formed in the second surface.

7. The X-ray detector according to claim 4, wherein the sealing member includes a second surface which faces an inside of the X-ray detector so as to face the terminal, and the metal member is coupled with a second coupling part formed in the second surface so as to directly contact the at least one magnetic substance.

8. The X-ray detector according to claim 3, wherein at least one magnetic substance is disposed adjacent to the terminal on the side frame, and
    the cap comprises:
    a metal member configured to interact with the at least one magnetic substance; and
    a sealing member in which the metal member is installed.

9. The X-ray detector according to claim 3, wherein at least one magnetic substance is disposed adjacent to the terminal on the side frame, and
    the cap comprises:
    a metal member configured to interact with the at least one magnetic substance; and
    a sealing member configured to surround at least one part of the metal member, the sealing member including a bent part which extends toward an inside of the X-ray detector.

10. The X-ray detector according to claim 9, wherein in the side frame, a resting part which is recessed and on which the bent part rests is formed.

11. The X-ray detector according to claim 1, wherein the side frame comprises a cap installation part with which the cap is detachably coupled,
    wherein the cap installation part comprises:
    a first area in which the terminal and at least one magnetic substance are disposed, and
    a second area provided along at least one outer edge of the first area, and
    wherein in the second area, a rib which protrudes outward from the X-ray detector is formed.

12. The X-ray detector according to claim 11, wherein the cap comprises:
    a metal member configured to interact with the at least one magnetic substance; and
    a sealing member configured to surround at least one part of the metal member,
    wherein if the cap is coupled with the cap installation part, the sealing member physically contacts the rib.

13. An X-ray detector configured to detect X-rays irradiated from an X-ray source, the X-ray detector comprising:
    a terminal including an opening formed by a plurality of inner surfaces; and
    a cap including at least a first end that is fixed at the X-ray detector and configured to cover the terminal to prevent a foreign material from entering the terminal, the cap including a first coupling part configured to extend into the opening of the terminal and to contact the plurality of inner surfaces of the terminal,
    wherein the terminal is formed in a side frame which forms a side appearance of the X-ray detector,
    wherein the cap is configured to be coupled with the side frame by a magnetic force.

14. An X-ray imaging apparatus comprising:
    an X-ray source configured to generate X-rays, and to irradiate the generated X-rays;
    an X-ray detector configured to detect the irradiated X-rays;
    a side frame provided to form a side appearance of the X-ray detector;
    a bottom frame coupled with the side frame;
    a battery cover coupled with the bottom frame and forming a bottom appearance of the X-ray detector with the bottom frame;

a sealing member disposed on one of the battery cover and the bottom frame along an area at which the battery cover is coupled with the bottom frame; and a coupling groove formed on the other of the battery cover and the bottom frame, wherein the sealing member is insertable into the coupling groove to prevent a foreign material from entering the inside of the X-ray detector.

15. The X-ray imaging apparatus according to claim 14, wherein a protrusion pattern is formed on a first one of the side frame and the bottom frame along an area at which the side frame is coupled with the bottom frame.

16. The X-ray imaging apparatus according to claim 15, wherein an adhesive member is disposed on a second one of the side frame and the bottom frame, and coupled with the protrusion pattern.

17. The X-ray imaging apparatus according to claim 16, wherein the adhesive member includes a waterproof tape.

18. The X-ray imaging apparatus according to claim 16, wherein the adhesive member includes at least one from among a double-sided adhesive member and a single-sided adhesive member.

19. The X-ray imaging apparatus according to claim 14, wherein the sealing member is double injection-molded.

20. The X-ray imaging apparatus according to claim 14, wherein the sealing member is formed integrally with the battery cover.

21. The X-ray imaging apparatus according to claim 14, wherein the sealing member extends around edges of the battery cover to form a sealing ring, and wherein the coupling groove extends around edges of a battery opening formed in the bottom frame to match a shape of the sealing ring.

* * * * *